US011299869B2

(12) United States Patent
Tomita

(10) Patent No.: US 11,299,869 B2
(45) Date of Patent: Apr. 12, 2022

(54) LOADING AMOUNT ACCUMULATION DEVICE AND LOADING AMOUNT ACCUMULATION SYSTEM

(71) Applicant: HITACHI CONSTRUCTION MACHINERY CO., LTD., Tokyo (JP)

(72) Inventor: Kunitsugu Tomita, Kashiwa (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 406 days.

(21) Appl. No.: 16/491,005

(22) PCT Filed: Oct. 27, 2017

(86) PCT No.: PCT/JP2017/039000
§ 371 (c)(1),
(2) Date: Sep. 4, 2019

(87) PCT Pub. No.: WO2019/082397
PCT Pub. Date: May 2, 2019

(65) Prior Publication Data
US 2020/0011031 A1    Jan. 9, 2020

(51) Int. Cl.
*E02F 9/24* (2006.01)
*B60G 17/019* (2006.01)
*B60P 1/04* (2006.01)
*E02F 9/22* (2006.01)
*G07C 5/00* (2006.01)

(52) U.S. Cl.
CPC .......... *E02F 9/24* (2013.01); *B60G 17/01908* (2013.01); *B60P 1/045* (2013.01);
(Continued)

(58) Field of Classification Search
CPC ........ B60G 17/01908; B60G 2300/026; B60G 2300/09; B60G 2400/5122;
(Continued)

(56) References Cited

U.S. PATENT DOCUMENTS 6,052,644 A * 4/2000 Murakami ............ B60W 10/06 701/93
8,833,861 B2    9/2014 Donnelli et al.
(Continued)

FOREIGN PATENT DOCUMENTS

JP    59-38576 U    3/1984
JP    2005-227269 A    8/2005
(Continued)

OTHER PUBLICATIONS

International Search Report of PCT/JP2017/039000 dated Nov. 28, 2017.

*Primary Examiner* — Hunter B Lonsberry
*Assistant Examiner* — Daniel L Greene
(74) *Attorney, Agent, or Firm* — Mattingly & Malur, PC

(57) ABSTRACT

A loading amount accumulation device includes a loading amount storage section 403 storing a loading amount, a loading amount calculation section 402 accumulating load weight data about a transport object in a working front to the loading amount, and updating the loading amount by the value after being accumulated, a difference calculation section 404 calculating a difference between a loaded amount of a vessel and the loading amount, an accumulation success/failure determination section 405 comparing an absolute value of the difference and a value Dth, determining that accumulation has failed when the absolute value is larger than the value Dth, and outputting a result, a loading amount correction section 406, when the failure is output as the result, performing correction so as to set the loaded amount data as the loading amount, and updating the loading amount by the corrected loading amount, and an output section outputting the loading amount.

7 Claims, 19 Drawing Sheets

(52) U.S. Cl.
CPC ............. *E02F 9/226* (2013.01); *G07C 5/008* (2013.01); *B60G 2300/026* (2013.01); *B60G 2400/61* (2013.01)

(58) Field of Classification Search
CPC ............ B60G 2400/61; B60G 2800/20; B60G 800/70; B60P 1/045; E02F 9/226; E02F 9/24; E02F 9/267; G01G 19/083; G01G 23/01; G01G 23/14; G07C 5/008; G07C 5/085

See application file for complete search history.

(56) References Cited

U.S. PATENT DOCUMENTS

| | | | |
|---|---|---|---|
| 9,221,659 B2 * | 12/2015 | Fukasu | ................ E02F 9/2029 |
| 2005/0000703 A1 * | 1/2005 | Furuno | ................ G01G 19/10 |
| | | | 172/2 |
| 2008/0319710 A1 | 12/2008 | Hsu et al. | |
| 2010/0238010 A1 * | 9/2010 | Ishikawa | ............... B66F 17/003 |
| | | | 340/441 |

FOREIGN PATENT DOCUMENTS

| | | | | |
|---|---|---|---|---|
| JP | 3787046 | A | 6/2006 | |
| JP | 2009-235819 | A | 10/2009 | |
| JP | 2014-001040 | A | 1/2014 | |
| WO | 03/033829 | A1 | 4/2003 | |
| WO | WO-2013065415 | A1 * | 5/2013 | ................ B60P 1/00 |
| WO | 2017/100455 | A1 | 6/2017 | |

* cited by examiner

LOADING AMOUNT ACCUMULATION DEVICE AND LOADING AMOUNT ACCUMULATION SYSTEM

TECHNICAL FIELD

The present invention relates to a technique for calculating a loaded amount of a transport object to be loaded from a loading machine to a transporting machine in mines or the like.

BACKGROUND ART

There is a technique of automatically highly accurately performing load measuring of a transport object during a loading operation when performing loading work with respect to a transporting machine such as a dump truck by using a loading machine like a hydraulic excavator. There has been disclosed in, for example, Patent Literature 1, a work amount monitor device of a hydraulic excavator which scoops and swings a transport object to transfer it to another place, which is "characterized in that in the work amount monitor device, there are provided a load calculating means which calculates a load inside a bucket during a swing operation in which the transport object is scooped and transported, and a load inside the bucket during a swing operation after the transport object is dumped, a bucket dump operation detecting means which outputs a load measurement instruction when the load difference between the loads during the two swing operations is a predetermine value or more, and a bucket dump operation is executed in a predetermined angle range in a swing direction, and a load measuring means which, when the load measurement instruction is output, measures a load immediately before the bucket dump operation as the load of the transferred transport object (abstract excerption)".

Also, there is a technique of detecting excess loading which occurs during the loading to a transporting machine, and notifying it to a loading machine. There has been disclosed in, for example, Patent Literature 2 that "in a machine including a frame and a dump body, an electronic controller is operatively connected to the machine, at least one accelerometer is arranged to measure the acceleration of the frame and/or dump body and provide an acceleration signal to the electronic controller, and the electronic controller is arranged to receive and analyze the acceleration signal and provide a loading signal indicative of an overloading state to a remote control station and/or a loading machine carrying out loading (abstract excerption).

CITATION LIST

Patent Literature

PATENT LITERATURE 1: Japanese Patent No. 3787046
PATENT LITERATURE 2: U.S. Pat. No. 8,833,861,

SUMMARY OF INVENTION

Technical Problem

When loading work is performed relative to the transporting machine by using the loading machine, it is desirable to perform loading without any excess and shortage with respect to a limited amount of loading of the transporting machine from the viewpoint of production efficiency. According to the technique disclosed in Patent Literature 1, since the operator of the loading machine is capable of performing the work while grasping the current loading amount, it becomes easy for the operator to perform loading without any excess and shortage relative to the limited amount of loading of the transporting machine. In the technique disclosed in Patent Literature 1, however, when a predetermined amount of bucket operation is not performed due to operation errors of the operator or the like, the accumulation of a bucket load is overlooked, and a loaded amount cannot be grasped with satisfactory accuracy.

Also, according to the technique disclosed in Patent Literature 2, the operator of the loading machine is able to grasp the overloading state, but is not capable of grasping it where the loaded amount is insufficient. Further, since the loading state is calculated using data acquired on the transporting machine side, variation occurs in the calculation accuracy for each transporting machine. Thus, it is not possible to grasp the loaded amount with stable accuracy on the loading machine side.

The present application has been made in view of the above circumstances, and it is an object thereof to provide a technique of grasping a loaded amount loaded on a transporting machine with satisfactory accuracy regardless of loading conditions, and improving production efficiency.

Solution to Problem

The present invention provides a loading amount accumulation device characterized by including: a loading amount storage section which stores a loading amount therein; a loading amount calculation section which accumulates input load weight data about a transport object in a working front provided to a loading machine to the loading amount stored in the loading amount storage section, and updates the loading amount stored in the loading amount storage section by a value after being accumulated; a difference calculation section which calculates a difference between input data about a loaded amount of a vessel provided to a transporting machine and the loading amount stored in the loading amount storage section; an accumulation success/failure determination section which compares an absolute value of the difference calculated by the difference calculation section and a predetermined threshold value, determines that accumulation has failed when the absolute value is larger than the threshold value, and outputs a determination result; a loading amount correction section which, when the determination result indicative of an accumulation failure is output from the accumulation success/failure determination section, performs correction so as to set the loaded amount data as the loading amount, and updates the loading amount stored in the loading amount storage section by the loading amount after being subjected to the correction; and an output section which outputs the loading amount stored in the loading amount storage section.

Advantageous Effects of Invention

According to the present invention, it is possible to grasp a loaded amount with satisfactory accuracy regardless of loading circumstances and improve production efficiency. Problems, configurations, and advantages other than the above will become apparent from the following description of embodiments.

BRIEF DESCRIPTION OF DRAWINGS

FIG. 6 FIGS. 6A and 6B are respectively a hardware configuration diagram of a weight measurement controller for a loading machine and a transporting machine in the first embodiment.

FIG. 13 FIGS. 13A through 13C are explanatory diagrams for describing an accumulation success/failure determination of the first embodiment.

DESCRIPTION OF EMBODIMENTS

Figure 1:
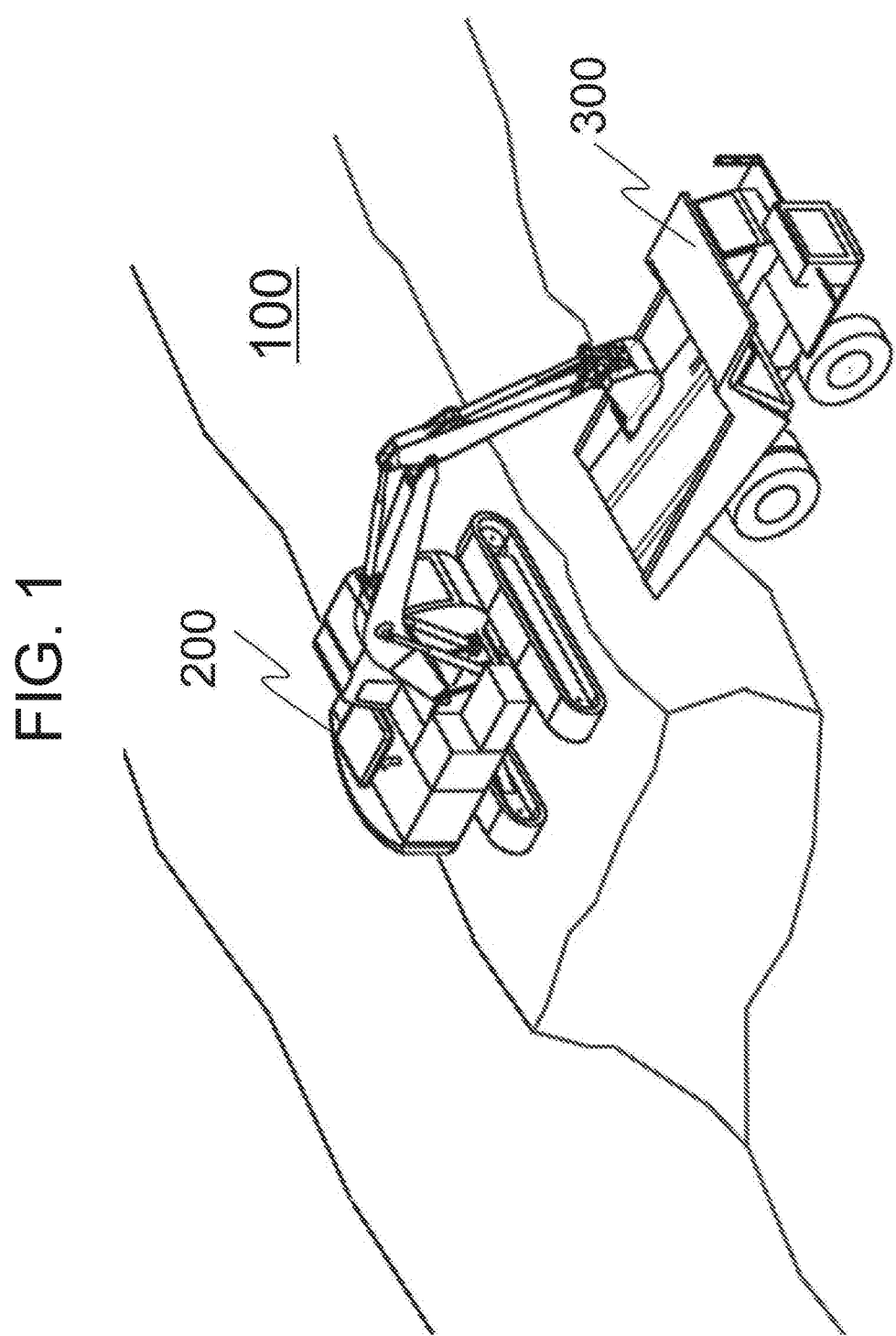
FIG. 1 is a schematic diagram of a loading amount accumulation device of a first embodiment.

Embodiments of the present invention will hereinafter be described in detail based on the drawings. Incidentally, in all the drawings for describing the embodiments, members having the same functions are denoted by the same or related reference numerals, and their repetitive description will be omitted. Also, in the following embodiments, the description of the same or similar parts will not be repeated in principle except when specifically required.

First Embodiment

A first embodiment of the present invention will be described. In the present embodiment, the amount of a transport object loaded onto a transporting machine is calculated on the loading machine side and the transporting machine side respectively. Hereinafter, in the present embodiment, the amount of the transport object loaded onto the transporting machine, which has been calculated on the loading machine side, is appropriately corrected using the amount of the transport object calculated on the transporting machine side. The present embodiment will hereinafter be described by taking for example a case where a hydraulic excavator is used as the loading machine, and a dump truck is used as the transporting machine.

A loading amount accumulation system of the present embodiment will first be described. FIG. 1 is a schematic diagram of the loading amount accumulation system 100 of the present embodiment.

As illustrated in the present figure, the loading amount accumulation system 100 of the present embodiment includes a hydraulic excavator 200 which is a loading machine, and a dump truck 300 which is a transporting machine.

In the excavation loading work in mines or the like, an unladen dump truck 300 first arrives, and the hydraulic excavator 200 stops at a loadable position, and thereafter loading work by the hydraulic excavator 200 is performed. Then, when a predetermined amount of loading is completed, the dump truck 300 starts. Then, also, the next dump truck 300 arrives, and the same work is repeated.

<Hydraulic Excavator>

Figure 2:
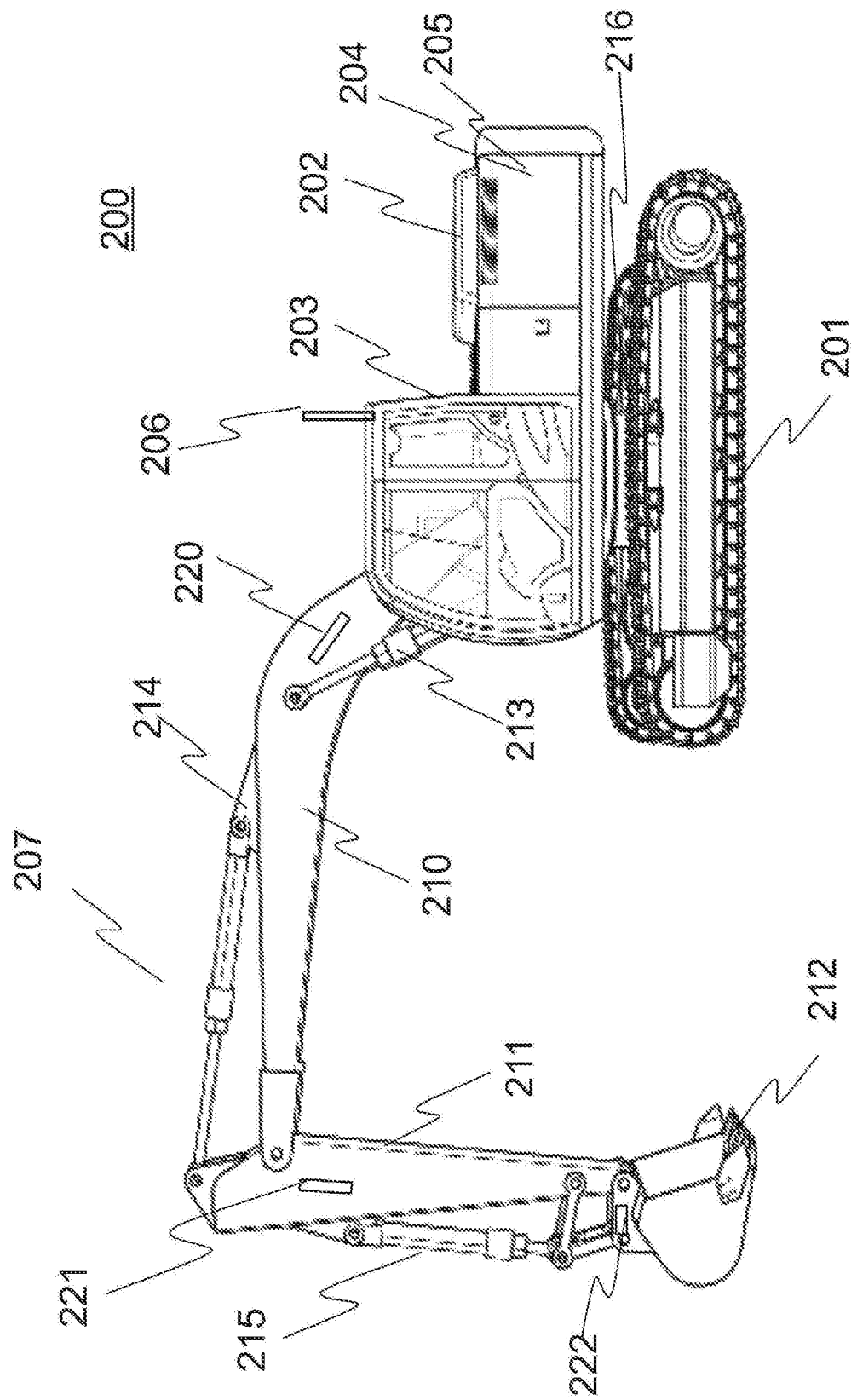
FIG. 2 is an external view of a hydraulic excavator of the first embodiment.

The hydraulic excavator 200 will next be described. FIG. 2 is an external view of the hydraulic excavator 200 in the present embodiment.

The hydraulic excavator 200 includes a lower vehicle body 201, an upperstructure 202, a cab 203, and a working front 207.

The lower vehicle body 201 includes a left travel base and a right travel base not illustrated in the drawing. The upperstructure 202 is pivotally mounted on the lower vehicle body 201. The cab 203 is mounted to the front of the upperstructure 202. The working front 207 is vertically swingably mounted to the front of the upperstructure 202. The upperstructure 202 is driven by a hydraulic drive circuit in accordance with an operation of an operator through a control lever to be described later.

<Working Front>

The working front 207 loads a work object such as earth and sand (hereinafter referred to as a transport object) into the dump truck 300. The working front 207 includes a boom 210, an arm 211, a bucket 212, a boom cylinder 213, an arm cylinder 214, and a bucket cylinder 215.

The boom 210 is vertically swingably mounted to the upperstructure 202. The arm 211 is vertically swingably mounted to the boom 210. The bucket 212 is vertically rotatably mounted to the arm 211.

Further, the boom cylinder 213, the arm cylinder 214, and the bucket cylinder 215 are hydraulic cylinders for driving the working front 207. The boom cylinder 213 is connected to the upperstructure 202 and the boom 210 to swing the boom 210 in a vertical direction. The arm cylinder 214 is connected to the boom 210 and the arm 211 to swing the arm 211 in the vertical direction. The bucket cylinder 215 is connected to the arm 211 and the bucket 212 to rotate the bucket 212 in the vertical direction.

Further, the working front 207 includes a boom angle sensor 220, an arm angle sensor 221, and a bucket angle sensor 222 to detect the posture of the working front 207.

The boom angle sensor 220 is provided in the boom 210 and detects an angle at which the boom 210 is rotated in the vertical direction. The arm angle sensor 221 is provided in the arm 211 and detects an angle at which the arm 211 is rotated. The bucket angle sensor 222 is provided in the bucket 212 and detects an angle at which the bucket 212 is rotated. The posture of the working front 207 to the upperstructure 202 is calculated based on the respective angles detected by these boom angle sensor 220, arm angle sensor 221 and bucket angle sensor and the dimension data of the boom 210, the arm 211, and the bucket 212, which are defined in advance.

The boom cylinder 213, the arm cylinder 214, and the bucket cylinder 215 are driven by the hydraulic drive circuit according to the operation of each control lever by the operator.

<Control Device>

Figure 3:
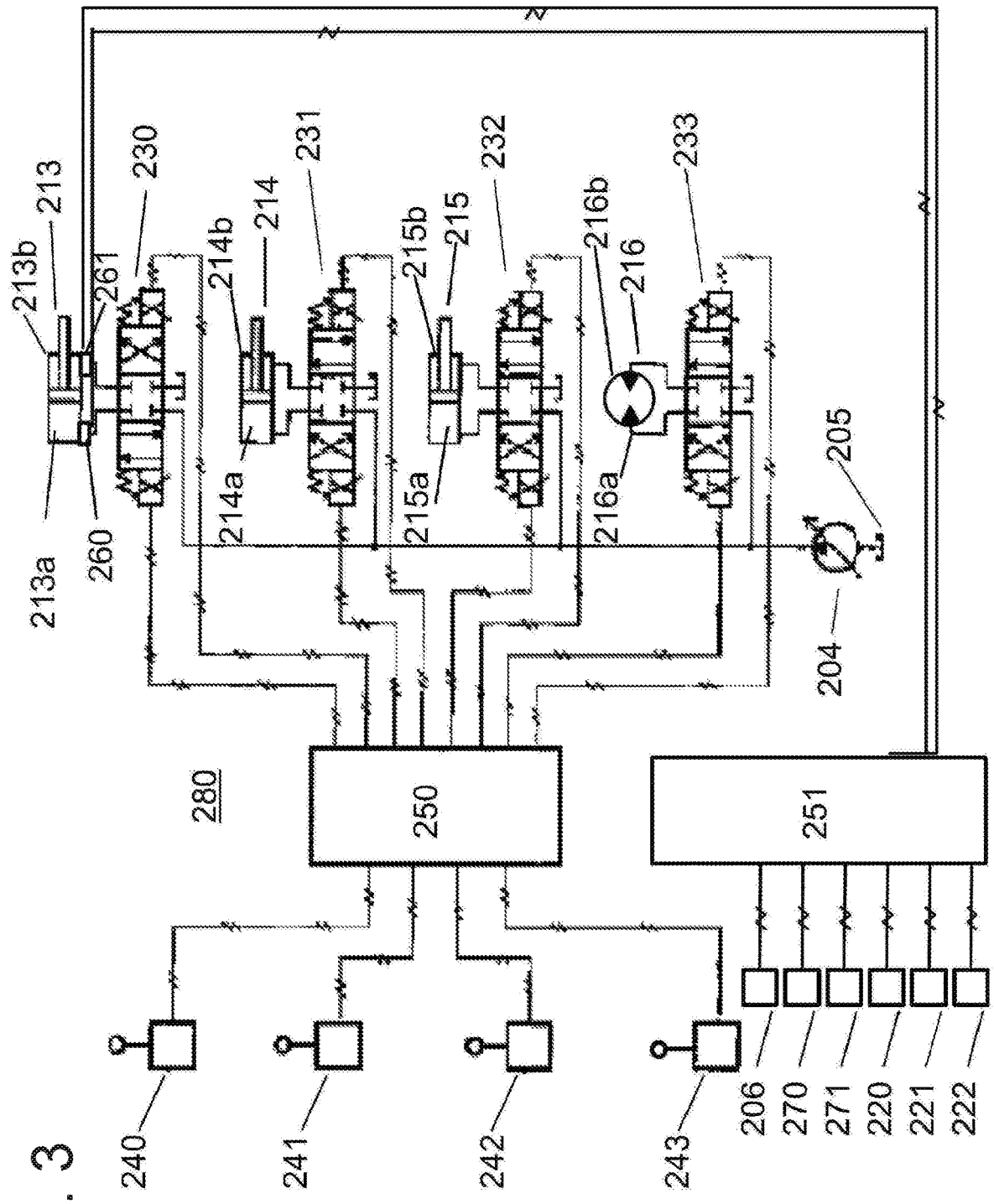
FIG. 3 is an explanatory diagram for explaining a control circuit of the hydraulic excavator of the first embodiment.

A control device 280 provided in the hydraulic excavator 200 will next be described using FIG. 3. The control device 280 includes a controller 250 for hydraulic control which controls the driving of the hydraulic drive circuit, and a controller 251 for display control which processes signals from the sensors or the like and thereby outputs results of their processing to a display device.

The controller 250 for hydraulic control drives the boom cylinder 213, the arm cylinder 214, the bucket cylinder 215, and a revolving motor 216 for revolving the upperstructure 202 through the hydraulic drive circuit, respectively, in accordance with the operations of a boom control lever 240, an arm control lever 241, a bucket control lever 242, and a revolving control lever 243.

The hydraulic drive circuit includes a main pump 204, a hydraulic oil tank 205, and control valves 230 through 233.

The main pump 204 is a main pump driven by an unillustrated engine. Pressure oil discharged from the hydraulic oil tank 205 by the main pump 204 is supplied to the boom cylinder 213, the arm cylinder 214, the bucket cylinder 215, and the revolving motor 216 through the control valves 230 to 233, respectively.

Respective operation signals output from the boom control lever 240, the arm control lever 241, the bucket control lever 242, and the revolving control lever 243 are taken into the controller 250 for hydraulic control. The respective operation signals taken in the controller 250 for hydraulic control are used to open/close and drive the control valves 230 through 233. The flow rate of the pressure oil supplied to each of the boom cylinder 213, the arm cylinder 214, the bucket cylinder 215, and the revolving motor 216 increases or decreases in proportion to a manipulated variable of each of the control levers 240 to 243.

When the pressure oil is supplied to a bottom side oil chamber 213a of the boom cylinder 213, the boom 210 is swingably driven upward relative to the upperstructure 202. When the pressure oil is supplied to a rod side oil chamber 213b in reverse, the boom 210 is swingably driven downward relative to the upperstructure 202.

When the pressure oil is supplied to a bottom side oil chamber 214a of the arm cylinder 214, the arm 211 is swingably driven downward relative to the boom 210. When the pressure oil is supplied to a rod side oil chamber 214b in reverse, the arm 211 is swingably driven upward relative to the boom 210. When the pressure oil is supplied to a bottom side oil chamber 215a of the bucket cylinder 215, the bucket 212 is rotatably driven downward relative to the arm 211. When the pressure oil is supplied to a rod side oil chamber 215b in reverse, the bucket 212 is rotatably driven upward relative to the arm 211.

Further, when the pressure oil is supplied to an oil passage 216a to which the revolving motor 216 is connected, the upperstructure 202 is rotatably driven in a left direction relative to the lower vehicle body 201. When the pressure oil is supplied to an oil passage 216b in reverse, the upperstructure 202 is rotatably driven in a right direction relative to the lower vehicle body 201.

A boom bottom pressure sensor 260 and a boom rod pressure sensor 261 are connected to the boom cylinder 213.

The boom bottom pressure sensor 260 detects the pressure of the bottom side oil chamber 213a. Further, the boom rod pressure sensor 261 detects the pressure of the rod side oil chamber 213b. Measured signals of the boom bottom pressure sensor 260 and the boom rod pressure sensor 261 are input to the controller 251 for display control.

Also, the respective angle sensors 220 to 222 are connected to the controller 251 for display control and these measured signals are also input thereto.

Further, a display monitor (display device) 270, a communication device 206, and a loading completion switch 271 are respectively connected to the controller 251 for display control.

Incidentally, the display monitor 270 is a user interface which displays a processing result of the controller 251 for display control and receives the input of an instruction. For example, the display monitor 270 is disposed in the cab 203. Further, the communication device 206 receives information from the dump truck 300 to be described later. The loading completion switch 271 is a switch to be pressed (ON) by the operator of the hydraulic excavator 200 when the loading work to a single dump truck 300 is completed. In the present embodiment, when the switch is brought to an ON state, a loading completion signal 271s is output.

The controller 251 for display control calculates the amount of the transport object loaded in the dump truck 300 by the hydraulic excavator 200 in response to the measured signals and instruction signals obtained from these connection devices and outputs the same to the display monitor 270. The details of the controller 251 for display control will be described later.

<Dump Truck>

Figure 4:
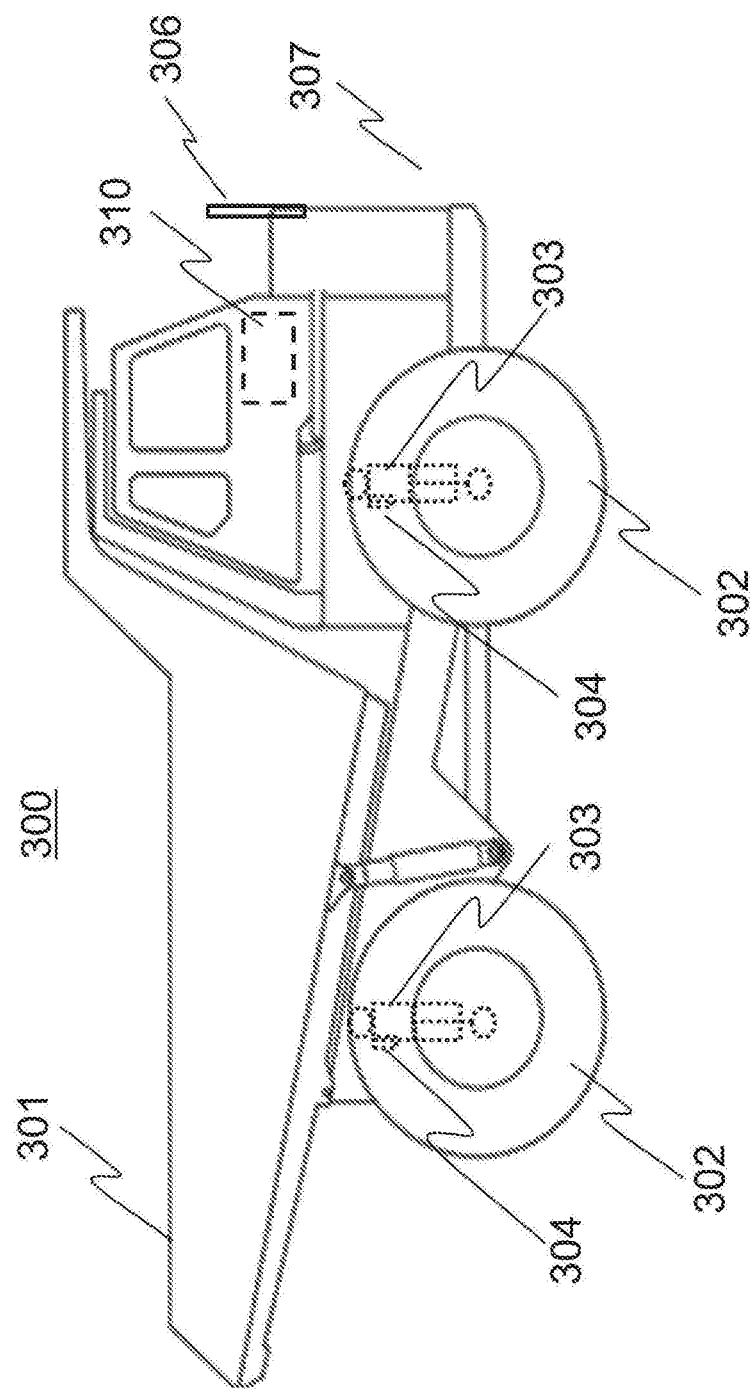
FIG. 4 is an external view of a damp truck of the first embodiment.

A description will next be made as to the dump truck 300 being the transporting machine in the present embodiment. FIG. 4 is a diagram showing an external appearance of the dump truck 300 in the present embodiment. The dump truck 300 travels loaded with the transport object. Further, the dump truck 300 includes a vehicle main body 307, a vessel 301, wheels 302, suspension cylinders 303, suspension pressure sensors 304, a communication device 306, and a control device 310.

The vehicle main body 307 is provided with an engine and a traveling motor not shown in the drawing. By transmitting the power of the traveling motor to the wheels 302, the dump truck 300 is allowed to travel. Transport objects such as soil are loaded in the vessel 301 by the hydraulic excavator 200. The vessel 301 is placed on the upper part of the vehicle main body 307.

The suspension cylinder 303 is disposed between the wheel 302 and the vehicle main body 307. A load corresponding to the total of the weight of the vehicle main body 307, the weight of the vessel 301, and the weight of the transport object loaded in the vessel 301 is applied to the wheel 302 via the suspension cylinder 303. When the transport object is loaded in the vessel 301, the suspension cylinder 303 is contracted according to its weight, so that the pressure (inner pressure) of the hydraulic oil enclosed in the interior thereof is increased.

The suspension pressure sensor 304 detects the inner pressure of the suspension cylinder 303. A detection signal of the suspension pressure sensor 304 is input to the control device 310. The suspension pressure sensor 304 is installed in each suspension cylinder 303 of the dump truck 300. The dump truck 300 in the present embodiment has the four wheels 302. Thus, the dump truck 300 includes the four suspension pressure sensors 304.

The communication device 306 is connected to the control device 310 and used for information transmission to the hydraulic excavator 200. The operation of the control device 310 will be described later.

<Functional Blocks of Controller for Display Control and Control Device>

Figure 5:
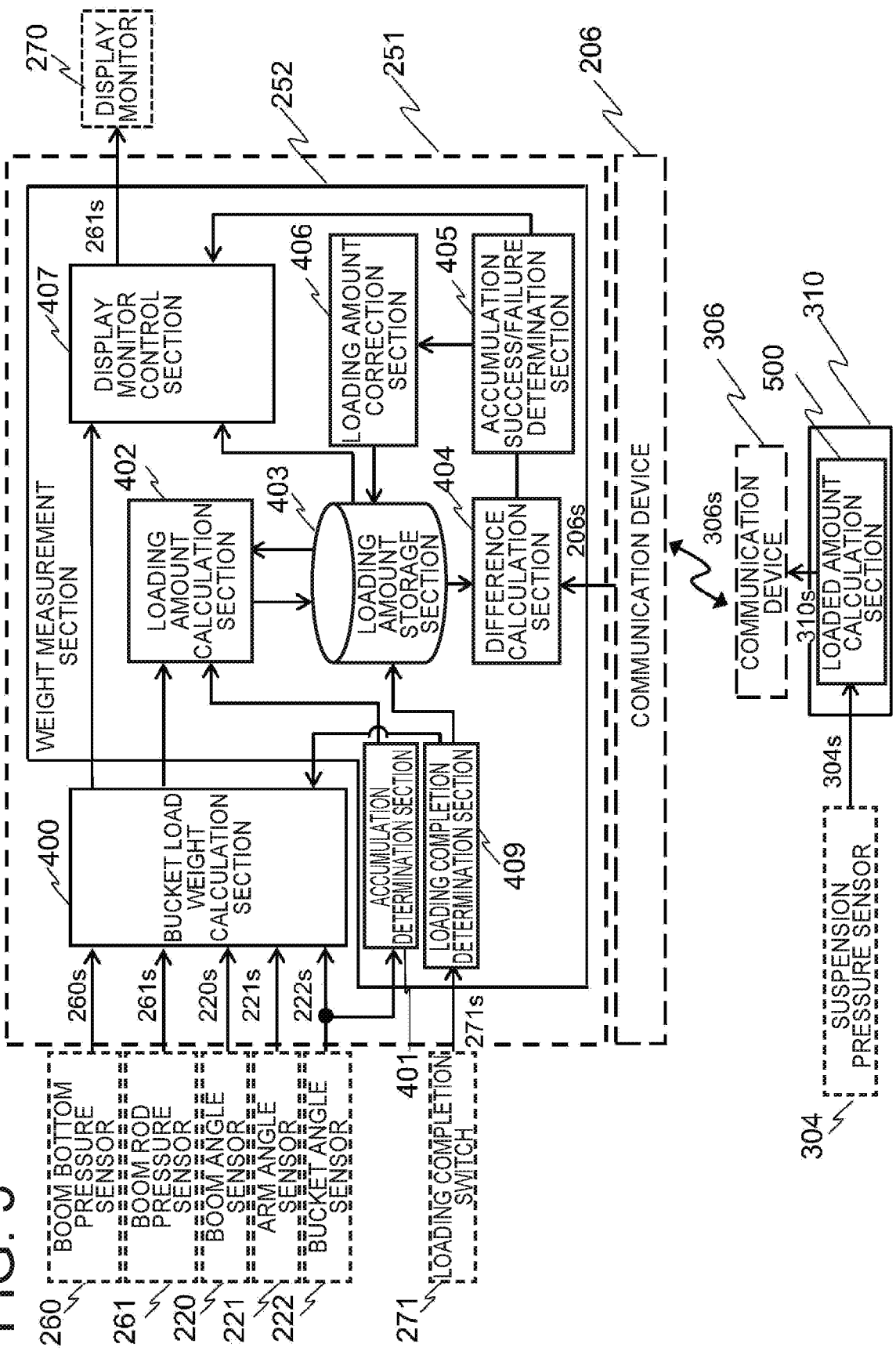
FIG. 5 is a functional block diagram of a weight measurement controller of the first embodiment.

The controller 251 for display control and the control device 310 in the present embodiment will next be described using FIG. 5. Hereinafter, in the present specification, the amount of a transport object loaded on the bucket 212, which is calculated from the measured value of each sensor on the hydraulic excavator 200 side, is referred to as a bucket load weight or simply referred to as a load weight. The accumulated value of the amount of the transport object loaded in the dump truck 300 by the bucket 212 is referred to as an amount to be loaded (loading amount). On the dump truck 300 side, the amount of the transport object loaded on its own vessel 301, which is calculated from the measured value of each sensor, is referred to as a loaded amount loaded thereon (loaded amount).

The controller 251 for display control is inputted with respective signals of a boom angle sensor signal (angle signal) 220s from the boom angle sensor 220, an arm angle sensor signal (angle signal) 221s from the arm angle sensor 221, a bucket angle sensor signal (angle signal) 222s from the bucket angle sensor 222, a boom bottom pressure sensor signal 260s from the boom bottom pressure sensor 260, a boom rod pressure sensor signal 261s from the boom rod pressure sensor 261, a loading completion signal 271s from the loading completion switch 271, and a communication signal 206s from the control device 310 via the communication device 206. An output signal from the controller 251 for display control is a display monitor signal 270s to the display monitor 270.

The controller 251 for display control is provided with a bucket load weight calculation section 400, and a weight measurement section 252. Further, the weight measurement section 252 includes an accumulation determination section 401, a loading amount calculation section 402, a loading amount storage section 403, a difference calculation section 404, an accumulation success/failure determination section 405, a loading amount correction section 406, a display monitor control section 407, and a loading completion determination section 409.

The bucket load weight calculation section 400 calculates the load weight of the transport object in the bucket 212 and outputs the same as a bucket load weight (load weight data).

The accumulation determination section 401 determines whether the transport object in the bucket 212 is loaded on the vessel 301 of the dump truck 300. The loading amount calculation section 402 calculates the total of the loading amount. The loading amount storage section 403 stores a calculation result of the loading amount calculation section 402. The difference calculation section 404 calculates the difference between the loading amount stored in the loading amount storage section 403 and the loaded amount calculated by a loaded amount calculation section 500 of the control device 310. The accumulation success/failure determination section 405 determines from the calculation result of the difference whether the measurement of the loading amount by the accumulation determination section 401 and the loading amount calculation section 402 is correctly conducted. The loading amount correction section 406 corrects the loading amount stored in the loading amount storage section 403 in response to the result of determination by the accumulation success/failure determination section 405. The display monitor control section 407 generates the display monitor signal 270s. The loading completion determination section 409 determines whether the loading is completed.

A suspension pressure sensor signal 304s from the suspension pressure sensor 304 is input to the control device 310. An output signal from the control device 310 is a communication signal 306s to the controller 251 for display control via the communication device 306.

The control device 310 includes the loaded amount calculation section 500 which calculates the weight of the transport object loaded on the vessel 301. Data of the loaded amount being the calculation result of the loaded amount calculation section 500 is output to the communication device 306 as the output signal 310s.

Incidentally, the controller 251 for display control and the control device 310 repeatedly execute a series of input and output in a control period set in advance.

<Hardware Configuration>

As shown in FIG. 6 A, the controller 251 for display control can be realized by an information processing device including a CPU 291, a RAM 292, a ROM 293, an input interface (I/F) 294, and an output I/F 296. Programs for realizing the above respective sections are stored in the ROM 293. The stored programs include, for example, a bucket load weight calculation program 400p for realizing the bucket load weight calculation section 400, an accumulation determination program 401p for realizing the accumulation determination section 401, an loading amount calculation program 402p for realizing the loading amount calculation section 402, a difference calculation program 404p for realizing the difference calculation section 404, an accumulation success/failure determination program 405p for realizing the accumulation success/failure determination section 405, a loading amount determination program 406p for realizing the loading amount correction section 406, a display monitor control program 407p for realizing the display monitor control section 407, and a loading completion determination program 409p for realizing the loading completion determination section 409. Incidentally, an instruction receiving program 408p is a program used in a third embodiment to be described later. Further, the above loading amount storage section 403 is provided in the RAM 292, for example.

The input I/F 294 is inputted with the respective signals of the boom angle sensor signal 220s, the arm angle sensor signal 221s, the bucket angle sensor signal 222s, the boom bottom pressure sensor signal 260s, the boom rod pressure sensor signal 261s, the loading completion signal 271s, and the communication signal 206s. The display monitor signal 270s is output from the output I/F 296.

The above respective functions are realized by, for example, loading the above programs stored in the ROM 293 or the like in advance into the RAM 292 by CPU 291 and executing the same. Further, various data necessary for processing, and data generated in the middle of the processing are stored in the ROM 293 and RAM 292.

Incidentally, the controller 251 for display control may include a magnetic storage device such as a hard disc drive in addition to a semiconductor memory such as the ROM 293 or the RAM 292.

Figure 6A:
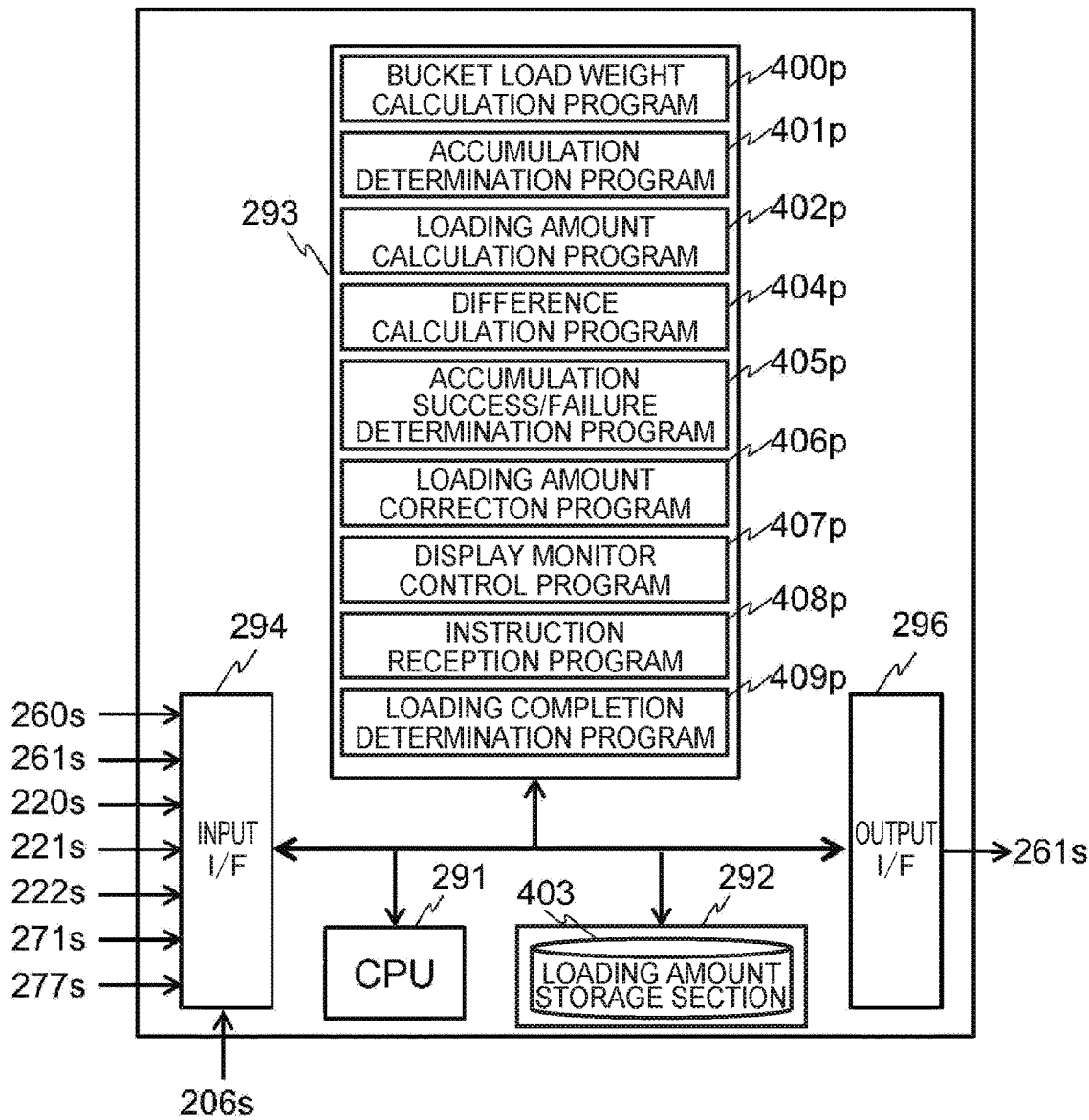
Figure 6B:
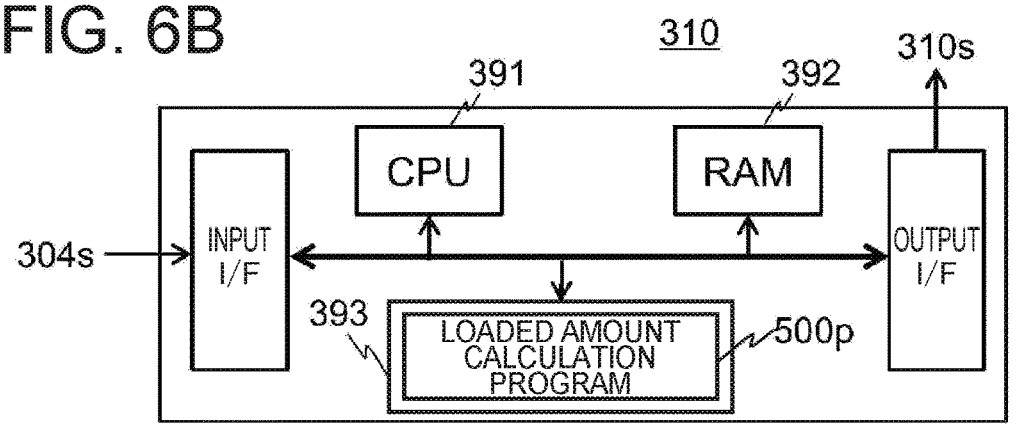

Further, as shown in FIG. 6B, the control device 310 can be realized by an information processing device including a CPU 391, a RAM 392, a ROM 393, an input I/F 394, and an output I/F 396. A loaded amount calculation program 500p for realizing the loaded amount calculation section 500 is stored in the ROM 393. The input I/F 394 is inputted with the suspension pressure sensor signal 304s, and the output signal 310s is output from the output I/F 396. Incidentally, a magnetic storage device such as a hard disk drive may be provided in addition to a semiconductor memory such as the ROM 393, the RAM 392 or the like.

<Overall Flow of Loading Amount Accumulation Processing>

Figure 7:
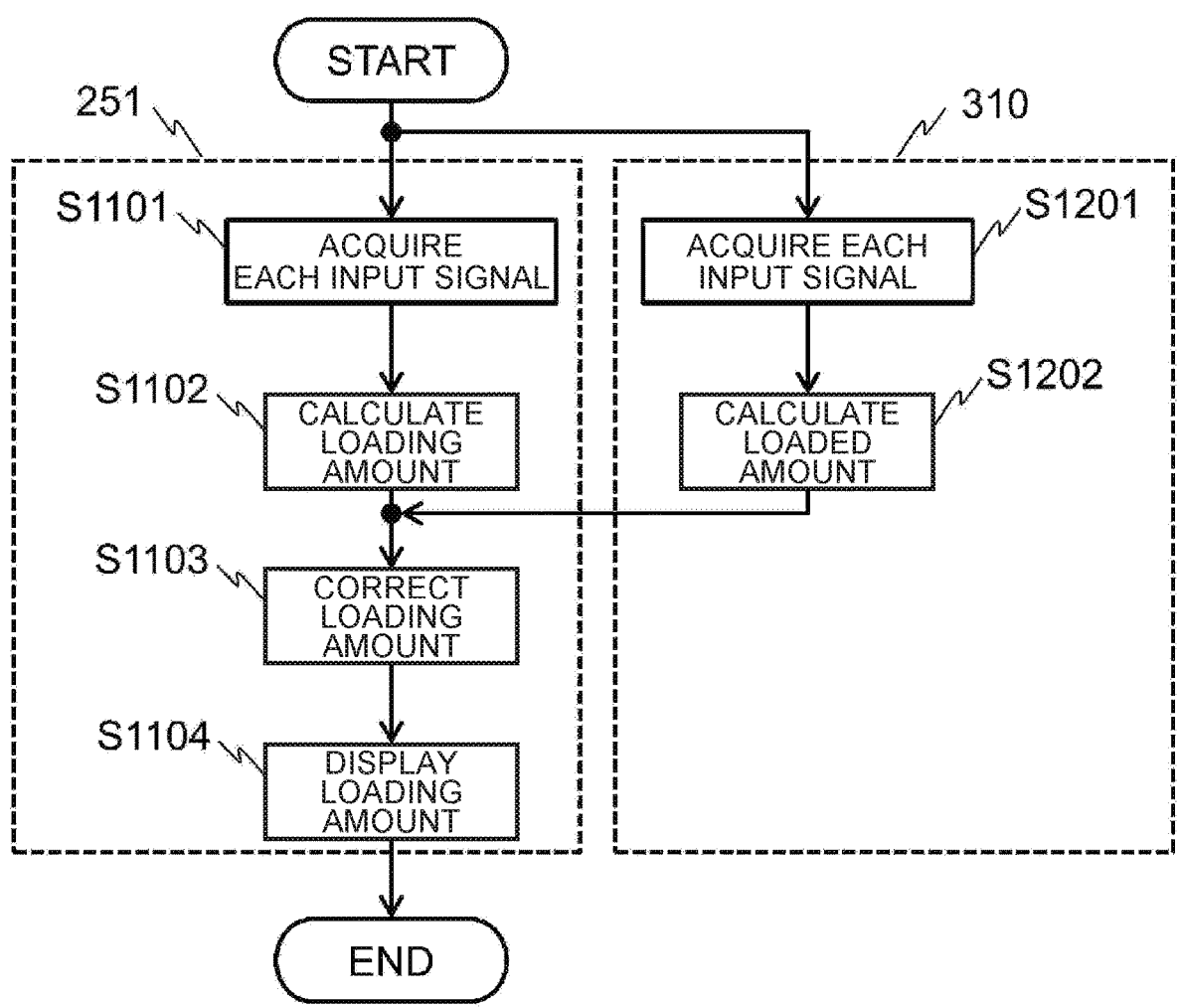
FIG. 7 is a flowchart of loading amount accumulation processing of the first embodiment.

Next, the flow of loading amount accumulation processing of the present embodiment will be described. FIG. 7 is a processing flow of the loading amount accumulation processing of the present embodiment. The loading amount accumulation processing of the present embodiment is executed at predetermined time intervals as described above.

First, the controller 251 for display control acquires each input signal (Step S1101). In the present embodiment, the bucket load weight calculation section 400 acquires a boom bottom pressure sensor signal 260s, a boom rod pressure sensor signal 261s, a boom angle sensor signal 220s, an arm angle sensor signal 221s, and a bucket angle sensor signal 222s. Also, the accumulation determination section 401 acquires a bucket angle sensor signal 222s. Further, the loading completion determination section 409 acquires a loading completion signal 271s.

Next, the weight measurement section 252 of the controller 251 for display control performs loading amount calculation processing on the hydraulic excavator 200 side, based on the respective signals acquired in Step S1101 (Step S1102).

Meanwhile, the control device 310 acquires each input signal (Step S1201). Here, the loaded amount calculation section 500 acquires a suspension pressure sensor signal 304s.

Then, the loaded amount calculation section 500 performs loaded amount calculation processing on the dump truck 300 side, based on the signals acquired in Step S1201 (Step S1202). A calculation result is output to the controller 251 for display control through the communication device 306.

Then, the weight measurement section 252 performs loading amount correction processing for correcting the loading amount calculated in Step S1102 by using the loaded amount calculated by the loaded amount calculation section 500 (Step S1103).

Finally, the weight measurement section 252 performs loading amount display processing for allowing the display monitor 270 to display the loading amount obtained by the loading amount correction processing (Step S1104), and the processing is terminated.

The details of each processing will hereinafter be described.

<Loading Amount Calculation Processing>

Figure 8:
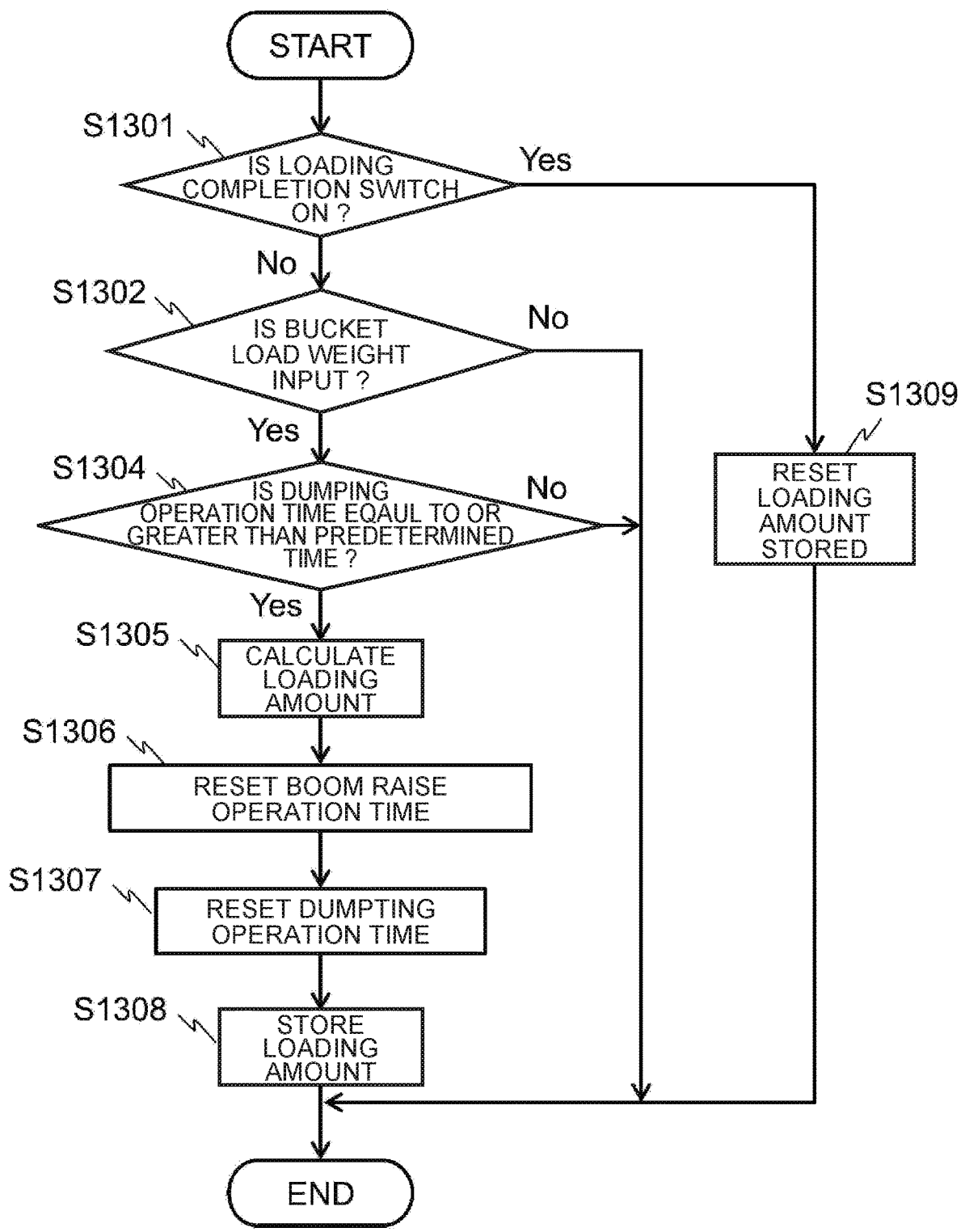
FIG. 8 is a flowchart of loading amount calculation processing of the first embodiment.

First, the loading amount calculation processing will be described using FIG. 8. FIG. 8 is a processing flow of the loading amount calculation processing.

In general, the hydraulic excavator 200 with its work tool as the bucket performs work by repeating the cycle of excavation, boom raise revolving, and dumping. In the present embodiment, this is used and with the detection of a boom raise operation and a bucket dumping operation for a predetermined time as a trigger, the calculation of the load weight and the calculation of the loading amount are performed, whereby the total of the loading amount is obtained.

Incidentally, the loading amount calculation processing is executed by the accumulation determination section 401, the loading amount calculation section 402, and the loading completion determination section 409 in the weight measurement section 252. A calculation result is stored in the loading amount storage section 403.

First, the loading completion determination section 409 performs an ON/OFF determination of the loading completion switch 271. Here, it is determined whether the loading completion switch 271 is in an ON state (Step S1301). As described above, when the loading completion switch 271 reaches the ON state, it outputs a loading completion signal 271s. When the loading completion signal 271s is acquired, the loading completion determination section 409 determines that the loading completion switch 271 is in the ON state. When it is determined that the loading completion switch 271 is not in the ON state, the loading completion determination section 409 outputs a determination result to the bucket load weight calculation section 400.

Figure 9:
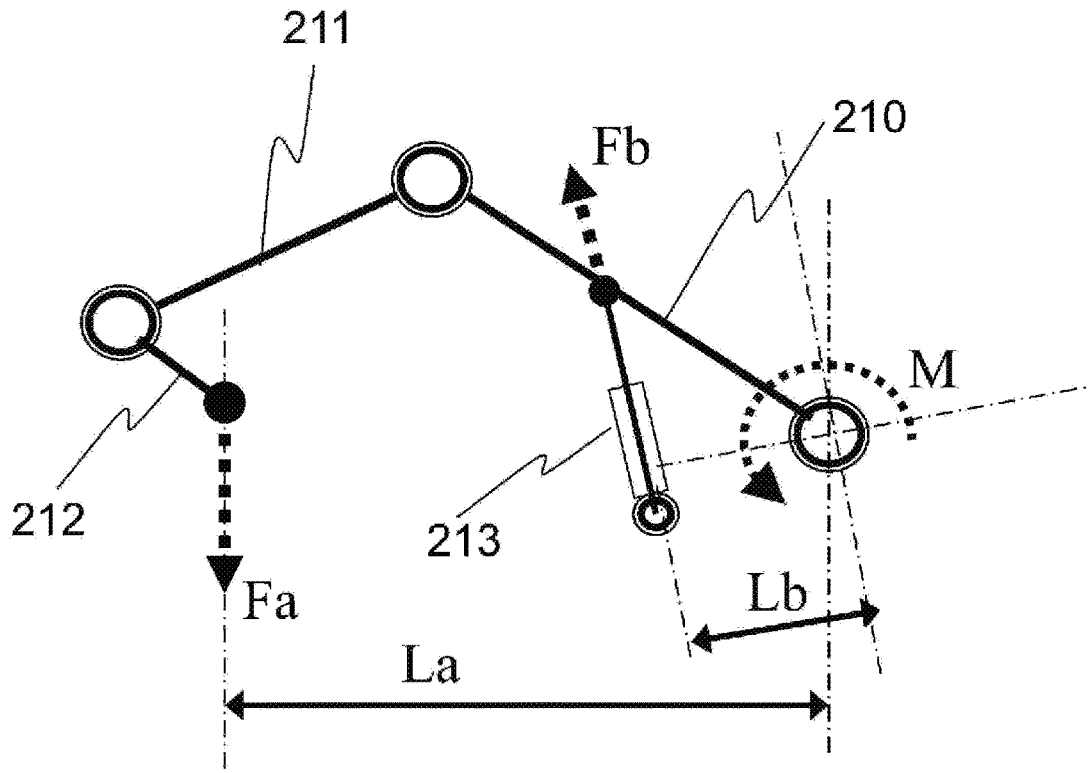
FIG. 9 is an explanatory diagram for explaining bucket load weight calculation processing of the first embodiment.

Here, the processing of the bucket load weight calculation section 400 which has received the output of the determination result will be described. FIG. 9 is a typical diagram for describing a calculation algorithm of the bucket load weight calculation.

In the bucket load weight calculation section 400, when the determination result is received, a boom raise operation time is determined. Here, it is determined whether the driving operation of the boom 210 in its upward direction to the upperstructure 202 is continuously performed for a first predetermined period or longer. The determination is performed using the boom angle sensor signal 220s. The bucket load weight calculation section 400 monitors the boom angle sensor signal 220s, counts a driving operation period in the upward direction as a boom raise operation time, and determines whether its length is the first predetermined period or more. The first predetermined period is determined in advance. Assuming that the first predetermined period is 5 [s], for example, it is determined that the boom raise operation has continuously been done where the boom angle sensor signal 220s changes in the boom raise direction continuously over 5 [s] or more. The boom raise operation time is stored in the RAM 292 or the like.

When the boom raise operation is determined to have been done continuously, the bucket load weight calculation section 400 calculates a bucket load weight being the amount of a transport object in the bucket 212 excavated by the operation of the working front 207, and outputs the same to the loading amount calculation section 402 and the display monitor control section 407 as load weight data. In other cases, the bucket load weight calculation section 400 does not output the load weight data.

The bucket load weight calculation processing by the bucket load weight calculation section 400 will be described here using FIG. 9. A bucket load weight Fa is calculated by solving an equilibrium equation of moment M in a boom pivotal center. The moment M generated accompanying the bucket load weight Fa is expressed in terms of $M=Fa \cdot La$ by using a horizontal distance La from a load weight point to the boom pivotal center. Whereas, moment M generated accompanying a thrust Fb of the boom cylinder 213 is expressed in terms of $M=Fb \cdot Lb$ by using a horizontal distance Lb to the boom pivotal center. The horizontal distances La and Lb are calculated using the detected values of the respective angle sensors 220 to 222. Further, the thrust Fb is calculated using the detected values of the boom bottom pressure sensor 260 and the boom rod pressure sensor 261. Using these, the bucket load weight Fa which is unknown is calculated by $Fb \cdot Lb/La$.

When the bucket load weight is input within the predetermined time (Step S1302), the accumulation determination section 401 makes a determination as to the dumping operation time. The accumulation determination section 401 monitors the bucket angle sensor signal 222s, counts the time (dumping operation time) during which the bucket 212 is rotatably driven in the upper direction with respect to the arm 211, and determines whether its length is a second predetermined period or more (Step S1304). When the dumping operation time continues over the second predetermined period or more, it is determined that the transport object has been loaded into the vessel 301 of the dump truck 300 by the bucket 212. Assuming that the second predetermined period is 2 [s], for example, it is determined that the dumping operation time is the second predetermined period or more where the bucket angle sensor signal 222s changes in a bucket dumping direction continuously over 2 [s] or more. The dumping operation time is stored in the RAM 292 or the like.

When the dumping operation time is the second predetermined period or more, the loading amount calculation section 402 performs a loading amount calculation (Step S1305). In Step S1303, the loading amount calculation section 402 calculates a loading amount, based on the bucket load weight calculated by the bucket load weight calculation section 400 and the determination result in Step S1304. Here, the bucket load weight calculated in Step S1303 is accumulated into the current loading amount stored in the loading amount storage section 403. Then, the loading amount stored in the loading amount storage section 403 is updated by the value after its accumulation.

Then, the loading amount calculation section 402 resets the boom raise operation time (Step S1306), also resets the dumping operation time (Step S1307), and stores the post-accumulation loading amount calculated in Step S1305 in the loading amount storage section 403 (Step S1308), and the processing is terminated. Incidentally, since the loading amount calculation section 402 is used in loading amount correction processing to be described later, a storage flag is set to the RAM 292 or the like where the loading amount is stored in the loading amount storage section 403.

Meanwhile, in Step S1302, when the duration of the boom raise operation time is less than the first predetermined period, the bucket load weight calculation section 400 does not output the bucket load weight to the weight measurement section 252. When the bucket load weight is not received within the predetermined time, the weight measurement section 252 ends the loading amount calculation processing as it is. Further, in Step S1304, the weight measurement section 252 ends the loading amount calculation processing as it is even where the dumping operation time is less than the second predetermined period.

Further, since the loading work to the dump truck 300 is finished when it is determined in Step S1301 that the loading completion switch is in the ON state, the loading completion determination section 409 resets the loading amount stored in the loading amount storage section 403 (the value of the loading amount being assumed to be 0) (Step S1309), and the loading amount calculation processing is ended.

<Loaded Amount Calculation Processing>

Figure 10:
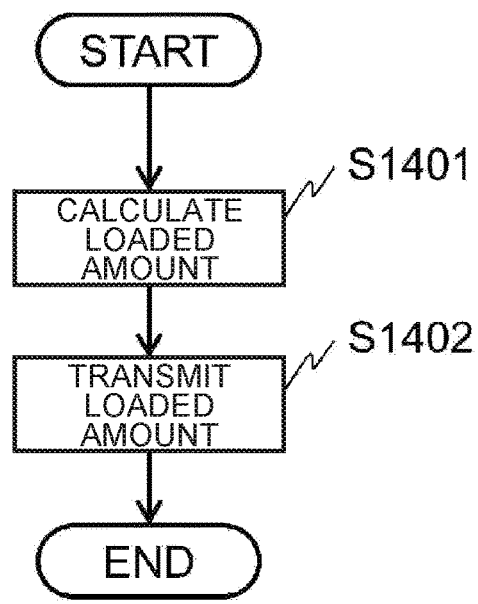
FIG. 10 is a flowchart of loaded amount calculation processing of the first embodiment.
Figure 11:
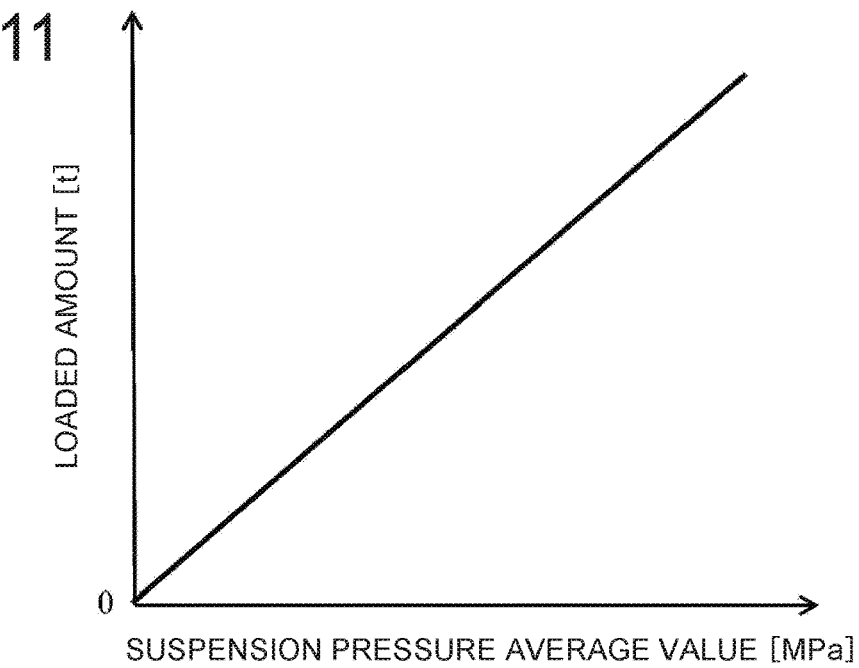
FIG. 11 is a graph showing a corresponding relation between suspension pressure and a loaded amount in the first embodiment.

Next, the loaded amount calculation processing in the control device 310 will be described using FIGS. 10 and 11. FIG. 10 is a processing flow of the loaded amount calculation processing, and FIG. 11 is a typical diagram for describing a calculation algorithm of the loaded amount calculation section 500.

The loaded amount calculation section 500 calculates a loaded amount to the vessel 301, based on the suspension pressure sensor signal 304s (Step S1401). The loaded amount is calculated based on the correspondence relation between the predetermined suspension pressure and the loaded amount. An example of the correspondence relation between the suspension pressure and the loaded amount is shown in FIG. 11. As described above, the dump truck 300 in the present embodiment is provided with the four wheels 302. Therefore, one dump truck 300 is provided with the four suspension pressure sensors 304. The horizontal axis of FIG. 11 indicates the average value of the detected values of these four suspension pressure sensors 304.

The loaded amount calculation section 500 transmits the calculated loaded amount to the controller 251 for display control via the communication device 306 as loaded amount data (Step S1402), and the processing is terminated.

<Loading Amount Correction Processing>

Figure 12:
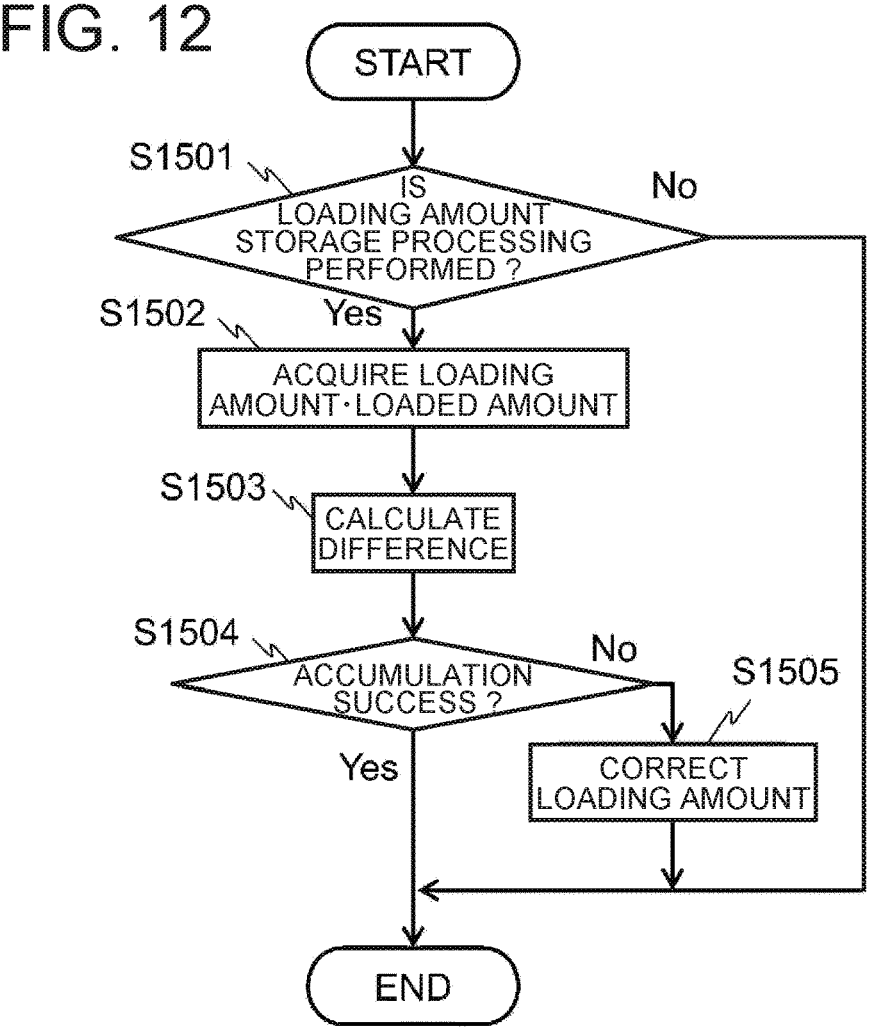
FIG. 12 is a flowchart of loading amount correction processing of the first embodiment.
Figure 13A:
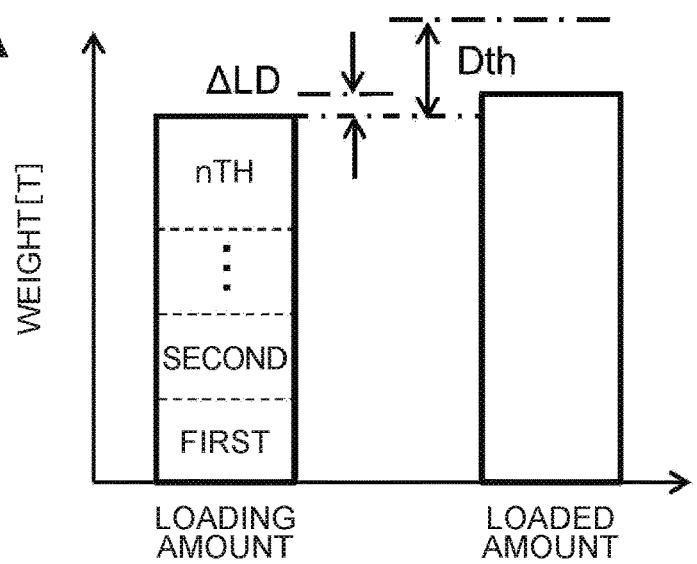
Figure 13B:
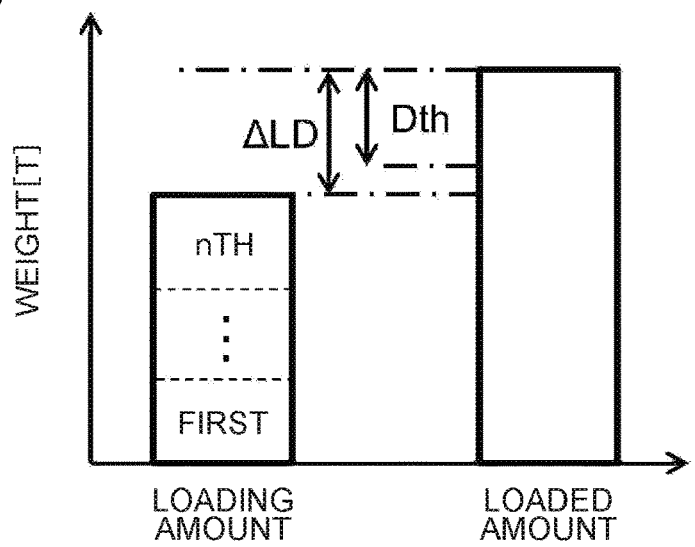
Figure 13C:
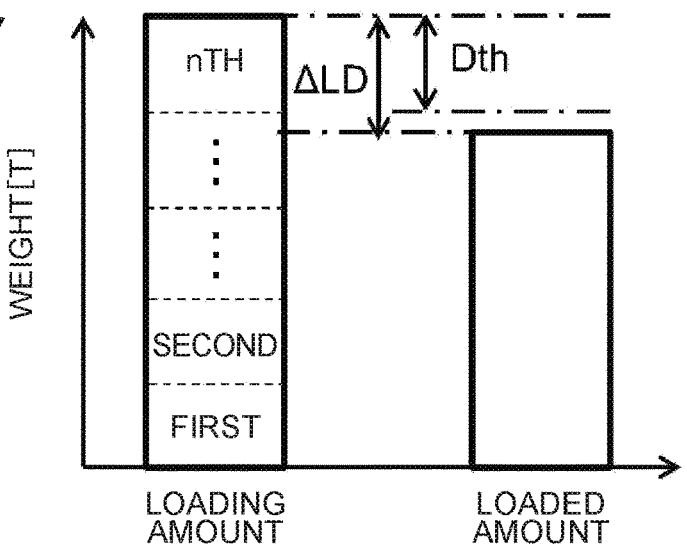

Next, the loading amount correction processing in Step S1103 will be described using FIG. 12, FIG. 13A, FIG. 13B, and FIG. 13C. FIG. 12 is a processing flow of the loading amount correction processing in the present embodiment. FIGS. 13A through 13C are typical diagrams for describing an accumulation success/failure determination.

First, in the immediately preceding loading amount calculation processing, the difference calculation section 404 determines whether the loading amount storage processing to the loading amount storage section 403 (processing of Step S1308) is performed (Step S1501). In the present embodiment, it is determined whether the aforementioned storage flag is set. Then, after the present determination, the corresponding flag is cleared.

When it is determined that the loading amount storage processing has been performed, the difference calculation section 404 acquires the loading amount stored in the loading amount storage section 403, and the loaded amount received from the control device 310 via the communication device 206 (Step S1502). Then, a difference calculation for calculating the difference between the loading amount and the loaded amount is performed (Step S1503).

Then, the accumulation success/failure determination section 405 performs an accumulation success/failure determination in response to the result of the difference calculation (Step S1504). Here, it is determined whether the calculation of the loading amount has been successful. The accumulation success/failure determination is made using a predetermined threshold value Dth for the difference calculation result. That is, the accumulation success/failure determination section 405 calculates the absolute value of the difference calculation result, compares it with the threshold value Dth, and thereby determines whether the absolute value is equal to or less than the threshold value Dth. If it is equal to or less than the threshold value Dth in the comparison result, the accumulation is determined to be successful. The determination result is output to the loading amount correction section 406 and the display monitor control section 407.

The threshold value Dth is previously stored in the ROM 293 or RAM 292 of the controller 251 for display control, for example. Its value is set to, for example, the rated capacity of the bucket 212 or below. The details of the determination will be described using FIGS. 13A through 13C.

FIG. 13A is a typical diagram showing a case in which the absolute value $\Delta LD$ of the difference between the loading amount and the loaded amount is in the range of the predetermined threshold value Dth ($\Delta LD \leq Dth$). In this case, since the result of determination by the accumulation success/failure determination section 405 is equal to or less than the threshold value Dth, the "accumulation success" is determined. In this case, the accumulation success/failure determination section 405 outputs information (accumulation success) indicative of the determination result being equal to or less than the threshold value Dth to the loading amount correction section 406 and the display monitor control section 407.

FIG. 13B and FIG. 13C are typical diagrams showing a case in which the absolute value ΔLD of the difference between the loading amount and the loaded amount is out of the range of the predetermined threshold value Dth (ΔLD>Dth). FIG. 13B shows the case in which the loaded amount is large, and FIG. 13C shows the case in which the loading amount is large. In this case, since the result of determination by the accumulation success/failure determination section 405 is larger than the threshold value, the "accumulation failure" is determined. In these cases, the accumulation success/failure determination section 405 outputs information (accumulation failure) indicative of the determination result being larger than the threshold value Dth to the loading amount correction section 406 and the display monitor control section 407.

In the accumulation success/failure determination, when the determination result is indicative of the accumulation success, the processing is terminated as it is. Whereas, in the case of the accumulation failure, the loading amount correction section 406 performs a loading amount correction (Step S1505), and the processing is ended. Incidentally, the loading amount correction is processing of overwriting the loading amount stored in the loading amount storage section 403 with the loaded amount received via the communication device 206.

<Loading Amount Display>

The loading amount display processing of Step S1104 will next be described.

The display monitor control section 407 displays the bucket load weight received from the bucket load weight calculation section 400 in Step S1302 and the loading amount stored in the loading amount storage section 403 on the display monitor 270. The display monitor control section 407 eventually displays the loading amount stored in the loading amount storage section 403. Further, the determination result by the accumulation success/failure determination section 405 in Step S1504 is also displayed together.

Figure 14:
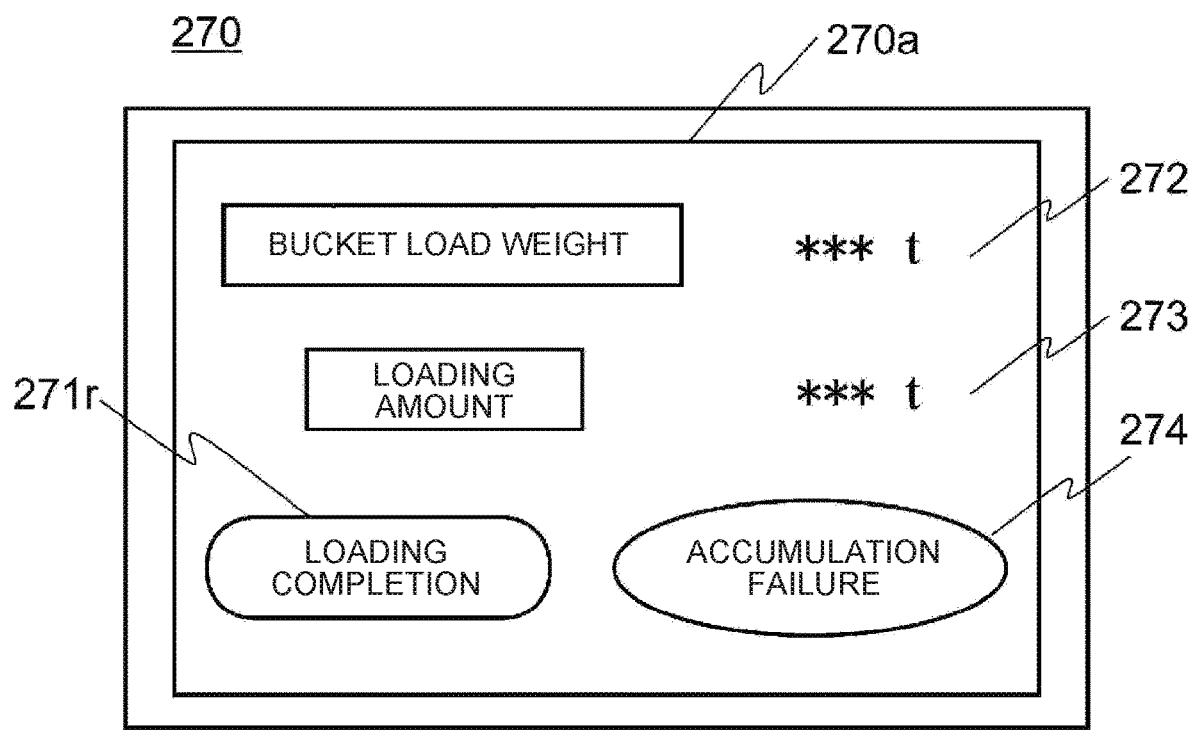
FIG. 14 is an explanatory diagram for describing a display screen example of the first embodiment.

An example of a display screen 270a displayed on the display monitor 270 is illustrated in FIG. 14. As described above, the display screen 270a includes a bucket load weight display area 272, a loading amount display area 273, and a determination result display area 274 of accumulation success/failure. Information indicative of the bucket load weight, the loading amount, and the determination result of the accumulation success/failure are displayed on their display sections.

The display of the determination result may be configured such that when it is determined that the determination result is "the accumulation failure", a lamp is lighted, and it is notified to the operator of the hydraulic excavator 200.

Incidentally, the display screen 270a may further include as the above-described loading completion switch 271, a loading completion instruction reception region 271r receiving a loading completion instruction.

As described above, in the loading amount accumulation system 100 of the present embodiment, the success/failure of the loading amount calculation on the hydraulic excavator 200 side is determined using the loading amount being the calculated value of the weight measurement section 252 of the hydraulic excavator 200, and the loaded amount being the calculated value of the loaded amount calculation section 500 of the dump truck 300, and the loading amount is corrected in the case of the failure.

Thus, according to the present embodiment, even when a significant deviation occurs in the loading amount calculation on the hydraulic excavator 200 side due to operation errors of the operator, etc., the calculation can be easily made appropriate using the measured value on the dump truck 300 side. Therefore, according to the present embodiment, the amount to be loaded to the dump truck 300 can be grasped with high accuracy regardless of a loading situation, and production efficiency is improved.

Also, according to the present embodiment, the result of determination as to the success/failure of the loading amount calculation is also notified to the operator of the hydraulic excavator 200. It is therefore possible for the operator to grasp the failure of the loading amount calculation on the hydraulic excavator 200 side. Accordingly, this can lead to a reduction in operation errors, and a further improvement in work efficiency can be expected.

Further, according to the present embodiment, the threshold value used for the success/failure determination of the loading amount calculation is set to the bucket rated capacity of the hydraulic excavator 200 or below. Thus, the loading amount is corrected with the loaded amount only where the difference larger than the rated capacity occurs between the loading amount and the loaded amount. That is, the calculation result on the hydraulic excavator 200 side higher in calculation accuracy is normally used, and the loaded amount calculated on the dump truck 300 side is used only where the difference more than the rated capacity of the bucket occurs. Therefore, the accuracy is stabilized, and the occurrence of accumulation failure/erroneous accumulation can be detected efficiently. Owing to these, a further improvement in work efficiency can be expected.

Second Embodiment

Next, a second embodiment of the present invention will be described. In the present embodiment, when the accumulation fails, its contents are discriminated and notified to the operator.

A configuration of a loading amount accumulation system 100 of the present embodiment is basically similar to that of the first embodiment. The present embodiment will hereinafter be described focusing on configurations different from the first embodiment.

Figure 15:
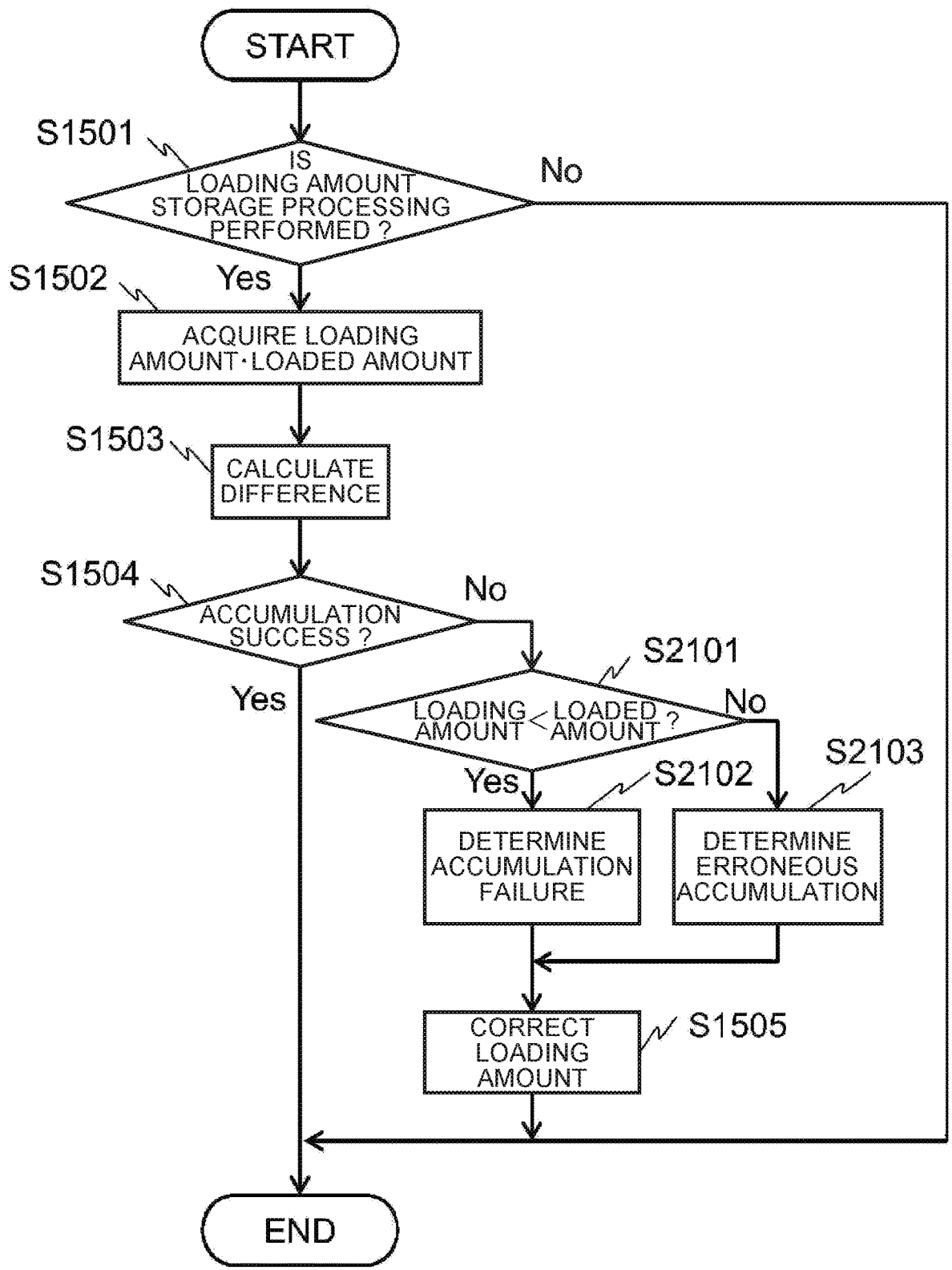
FIG. 15 is a flowchart of loading amount correction processing of a second embodiment.

In the present embodiment, the processing contents of the accumulation success/failure determination section 405 in the weight measurement section 252 are different. The flow of loading amount correction processing of the present embodiment will hereinafter be described. FIG. 15 is a processing flow of the loading amount correction processing of the present embodiment.

As shown in the present figure, in the loading amount correction processing of the present embodiment, when the accumulation is determined to fail in the accumulation success/failure determination of Step S1504 in the loading amount correction processing of the first embodiment, processing (content specifying processing) of specifying the contents of its failure is performed during the time up to the loading amount correction of Step S1505. The present embodiment is similar in other processing to the first embodiment.

In the content specifying processing, the accumulation success/failure determination section 405 determines the magnitude between the loading amount and the loaded amount and specifies the failed contents from the determination result.

That is, when the accumulation is determined to fail in Step S1504, the accumulation success/failure determination section 405 performs magnitude comparison between the loading amount and the loaded amount (Step S2101). Here, the accumulation success/failure determination section 405 determines, for example, the positive or negative sign of the calculation result of the difference calculation section 404 and specifies the failed contents according to the result of its determination. Incidentally, the failed contents are stored in the ROM 293 or the like in advance in association with the determination result.

For example, when the loading amount is smaller than the loaded amount, the accumulation success/failure determination section 405 specifies the failed contents as one due to the failure of the accumulation. This is an example shown in FIG. 13B. Meanwhile, when the loading amount is larger than the loaded amount, the accumulation success/failure determination section 405 specifies the failed contents as one due to the erroneous accumulation. This is an example shown in FIG. 13B. There are, for example, a case in which the transport object in the bucket 212 is spilt upon loading, etc.

The accumulation success/failure determination section 405 outputs the determination result, i.e., the failed contents specified by the determination result to the display monitor control section 407 and proceeds to the processing of Step S1505.

Incidentally, in the loading amount display processing of Step S1104, further, the determination result, i.e., the specified contents are also displayed together. In this case, the display screen 270a includes a failure content display area 275 displaying the contents of the accumulation failure in place of the determination result display area 274 as shown in FIG. 16.

Figure 16:
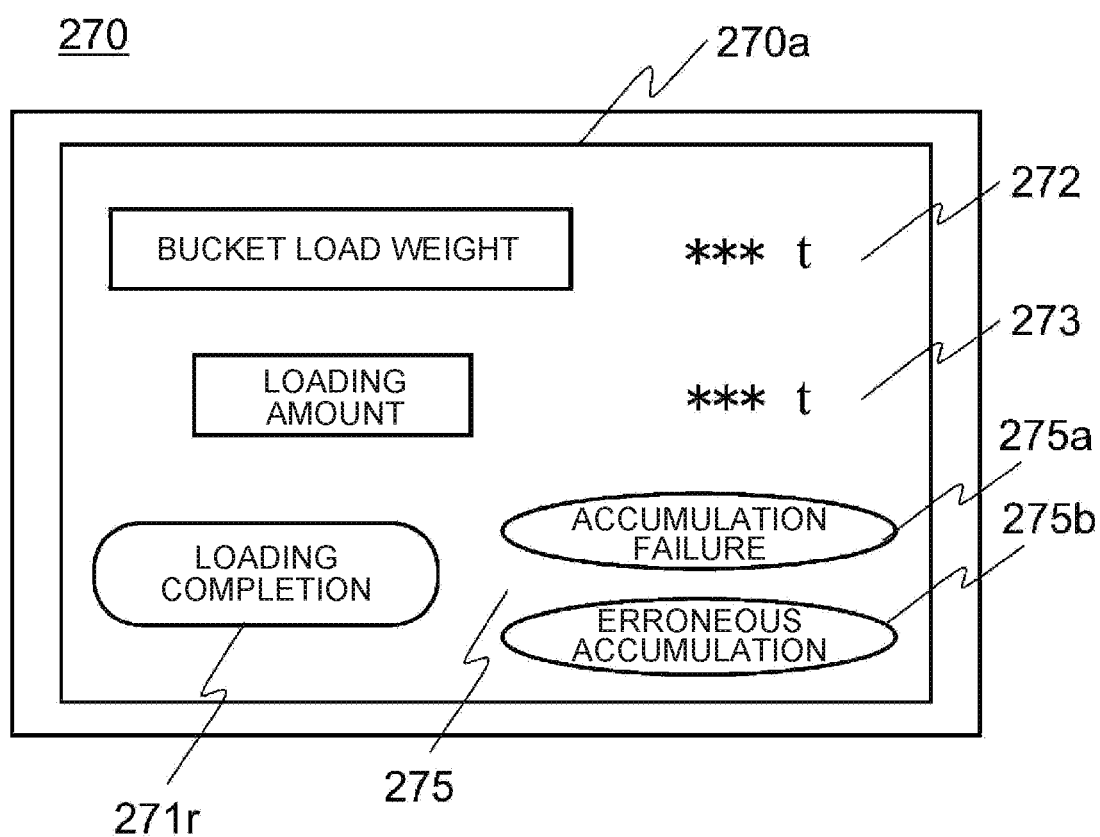
FIG. 16 is an explanatory diagram for explaining a display screen example of the second embodiment.

The example of the display screen 270a shown in FIG. 16 shows a configuration in which the failure content display area 275 is provided with lamps 275a and 275b for the contents of the accumulation failure, and the lamp for the determined contents is lighted. Consequently, the determination result is notified to the operator of the hydraulic excavator.

As described above, according to the present embodiment, as with the first embodiment, the absolute value of the difference between the loading amount and the loaded amount is calculated, and a correction to define the loaded amount to be the loading amount is performed where the calculated absolute value is greater than the predetermined threshold value. Therefore, according to the present embodiment, an effect similar to that of the first embodiment is obtained. Further, according to the present embodiment, the contents (accumulation failure/erroneous accumulation) of the loading amount calculation failure are notified to the operator of the hydraulic excavator 200. Therefore, in terms of the failure of the loading amount calculation, the operator is capable of grasping its contents in detail. Thus, this can lead to a reduction in operation errors, and a further improvement in work efficiency can be expected.

Third Embodiment

Next, a description will be made as to a third embodiment of the present invention. In the first and second embodiments, when it is determined that the accumulation failure is made, the loading amount is automatically corrected using the loaded amount calculated by the dump truck 300. In the present embodiment, however, the correction using the loaded amount is performed only where the operator permits the correction.

Hereinafter, the present embodiment will be described focusing on configurations different from the first embodiment.

Figure 17:
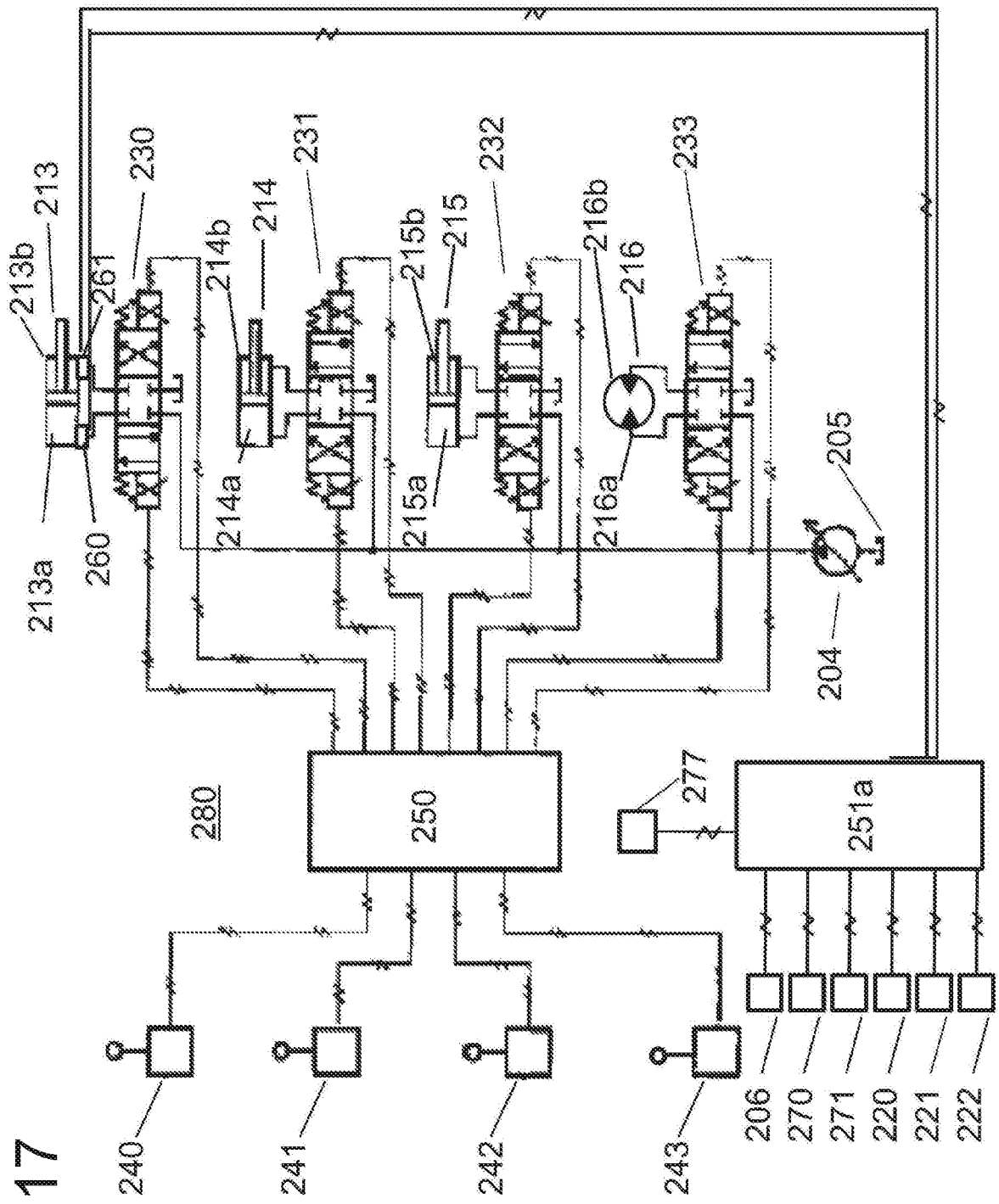
FIG. 17 is an explanatory diagram for explaining a control circuit of a hydraulic excavator of a third embodiment.

The hydraulic excavator 200 of the present embodiment further includes a correction instruction reception switch 277 as shown in FIG. 17. Then, the weight measurement section 252a of the present embodiment further receives an operation signal (correction instruction reception signal 277s) of the correction instruction reception switch 277. The correction instruction reception signal 277s is output to the weight measurement section 252a.

The correction instruction reception switch 277 receives an instruction as to whether to perform the correction from the operator and outputs an operation signal corresponding to the instruction. In the present embodiment, the correction instruction reception switch 277 is brought to an ON state when the correction is performed. Then, the correction instruction reception switch 277 outputs the correction instruction reception signal 277s when it is in the ON state.

Figure 18:
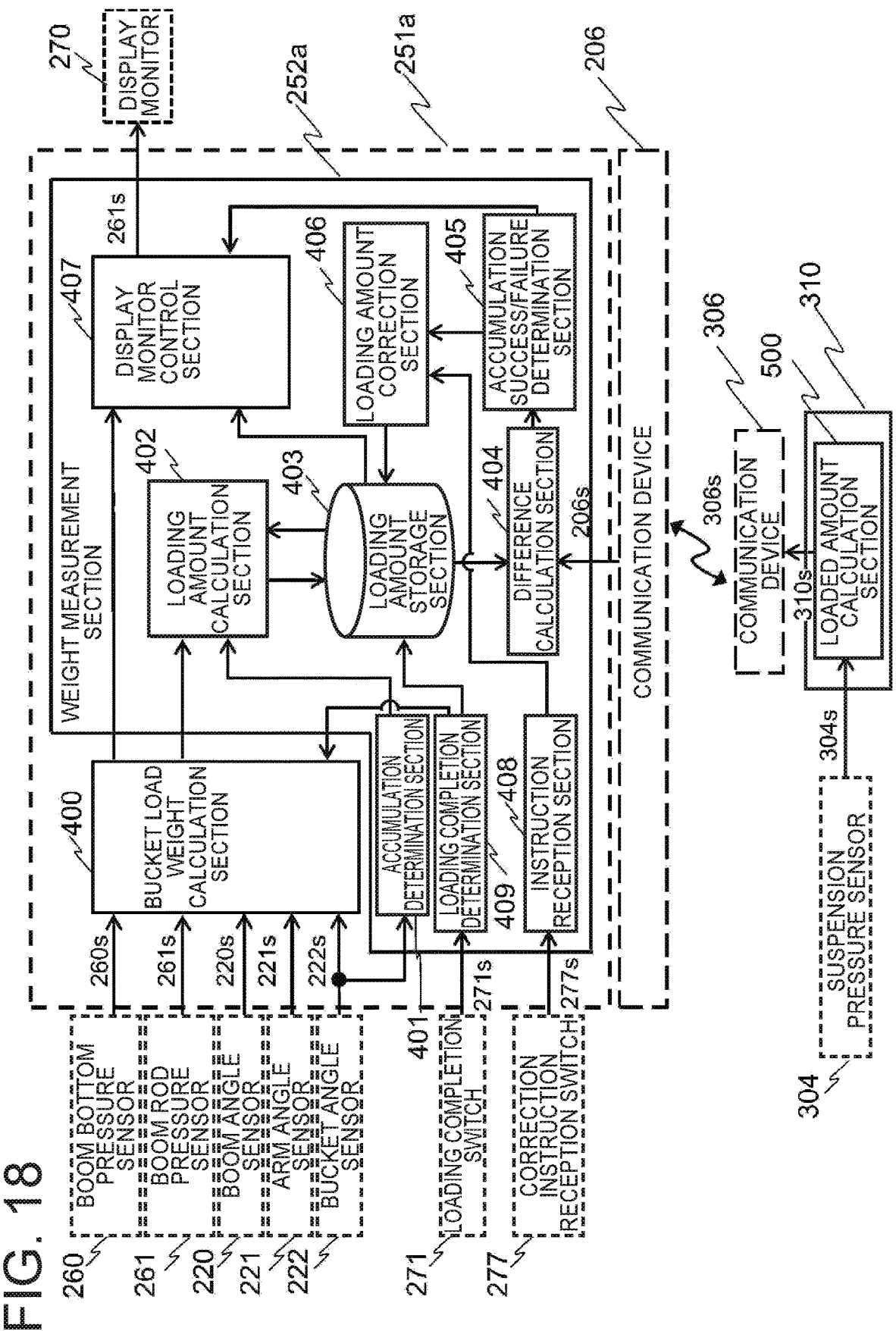
FIG. 18 is a functional block diagram of a weight measurement controller of the first embodiment.

Next, the function of the controller 251a for display control of the present embodiment will be described. FIG. 18 is a functional block diagram of the controller 251a for display control and the control device 310 in the present embodiment.

The weight measurement section 252a of the controller 251a for display control of the present embodiment includes an instruction reception section 408 in addition to each section of the weight measurement section 252a of the first embodiment. Incidentally, the control device 310 is similar to the first embodiment. Further, the hardware configurations of both controllers are the same as in the first embodiment. However, as shown in FIG. 6A, an instruction reception program 209p realizing the instruction reception section 408 is further stored in the ROM 293.

The correction instruction reception signal 277s is input to the instruction reception section 408. The instruction reception section 408 determines according to whether or not it receives the correction instruction reception signal 277s, whether or not to perform a loading amount correction (overwriting of the stored value of the loading amount storage section 403) by the loading amount correction section 406.

Figure 19:
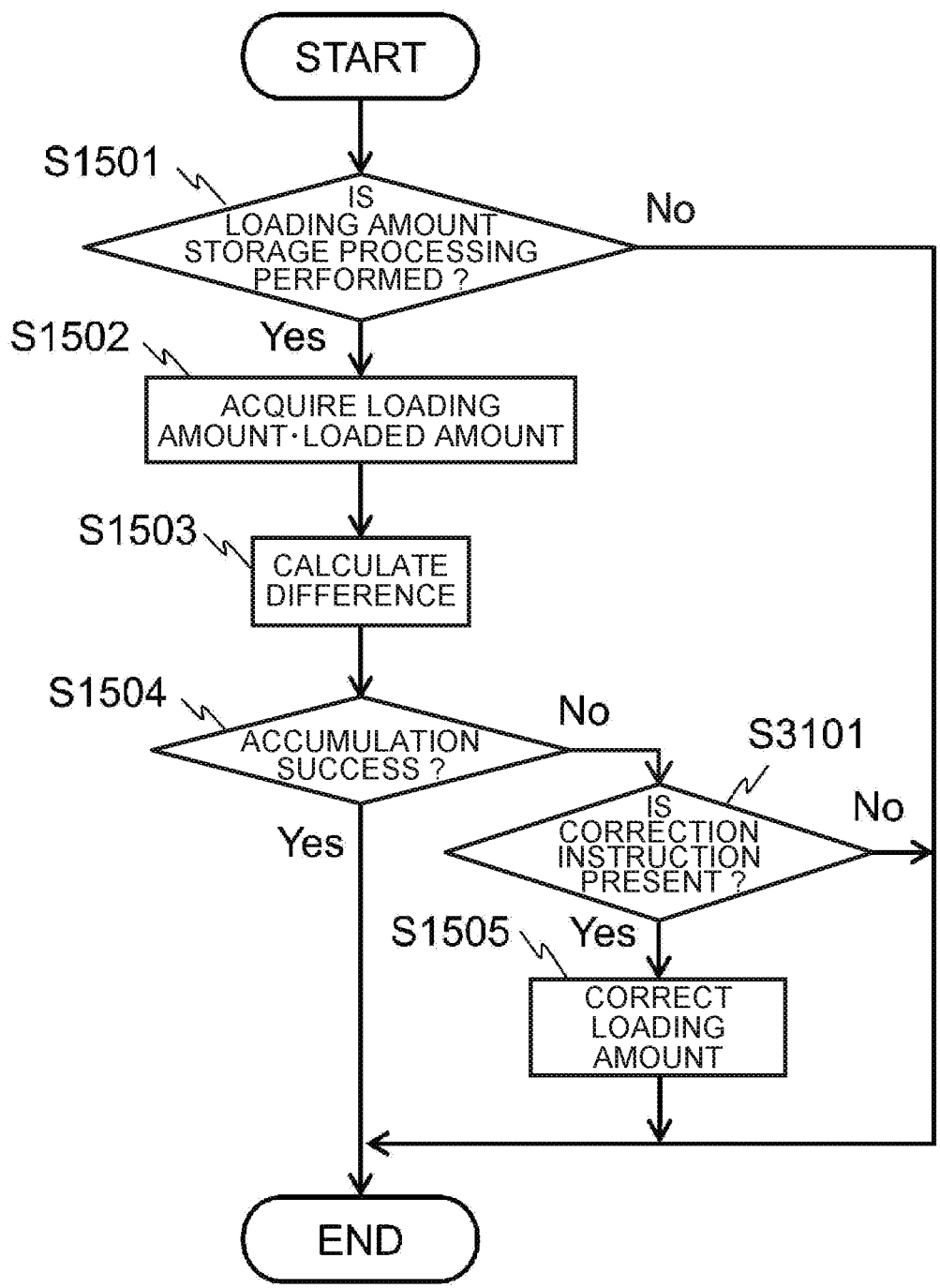
FIG. 19 is a flowchart of loading amount correction processing of the third embodiment.
Figure 20:
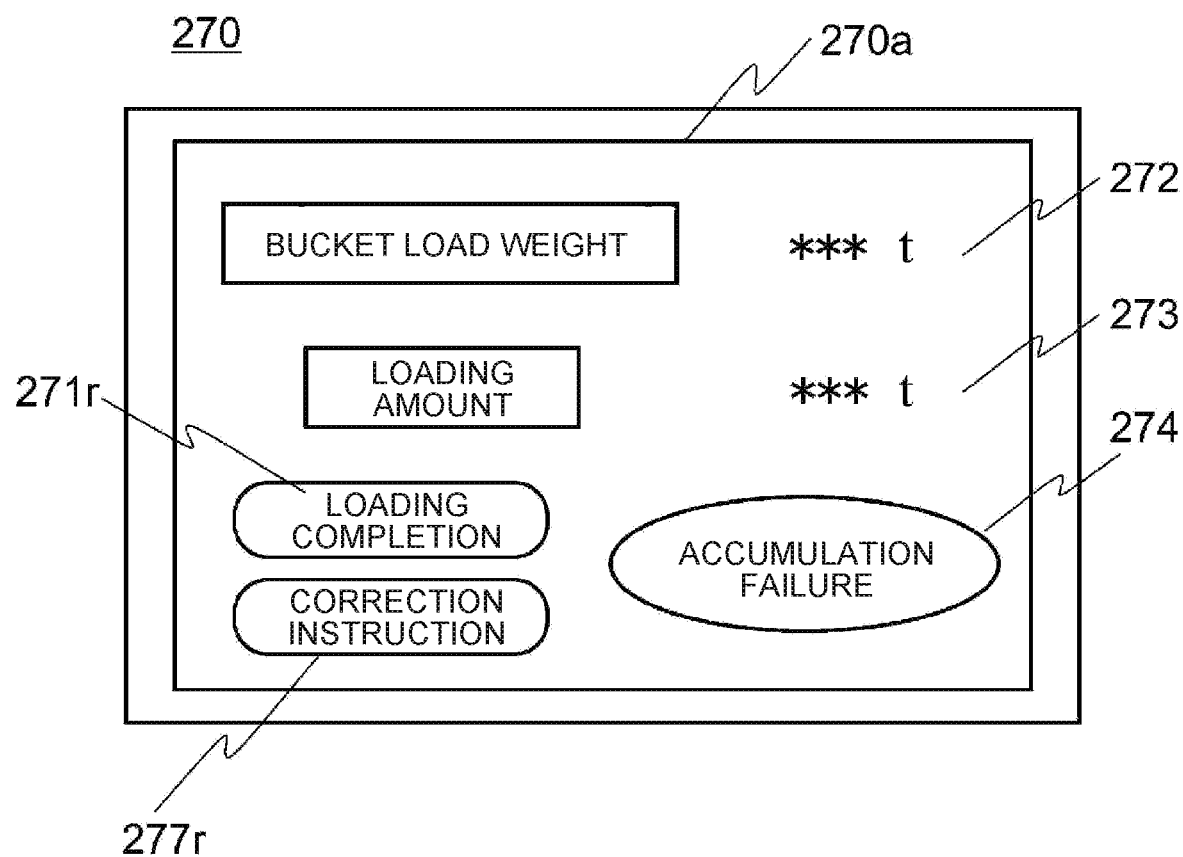
FIG. 20 is an explanatory diagram for explaining a display screen example of the third embodiment.

Next, the flow of loading amount correction processing of the present embodiment will be described. FIG. 19 is a processing flow of the loading amount correction processing of the present embodiment.

As shown in the present figure, in the loading amount correction processing of the present embodiment, when the accumulation is determined to fail in the accumulation success/failure determination of Step S1504 in the loading amount correction processing of the first embodiment, the instruction reception section 408 determines whether or not accepting an instruction for the correction from the operator (Step S3101). The determination is performed as described above by whether it is receiving the correction instruction reception signal 277s.

Then, when the instruction reception section 408 receives the correction instruction reception signal 277s therein, the instruction reception section 408 determines that the correction instruction is present. Whereas, when no instruction is accepted, the instruction reception section 408 determines that the correction instruction is absent. The determination result is output to the loading amount correction section 406.

Only when the loading amount correction section 406 is notified of the correction instruction being at present from the instruction reception section 408, the loading amount correction section 406 performs the loading amount correction processing of Step S1505. When no correction instruction is accepted, the loading amount correction section 406 does not perform the correction processing and ends the processing. Other processing is the same as in the first embodiment.

Figure 21:
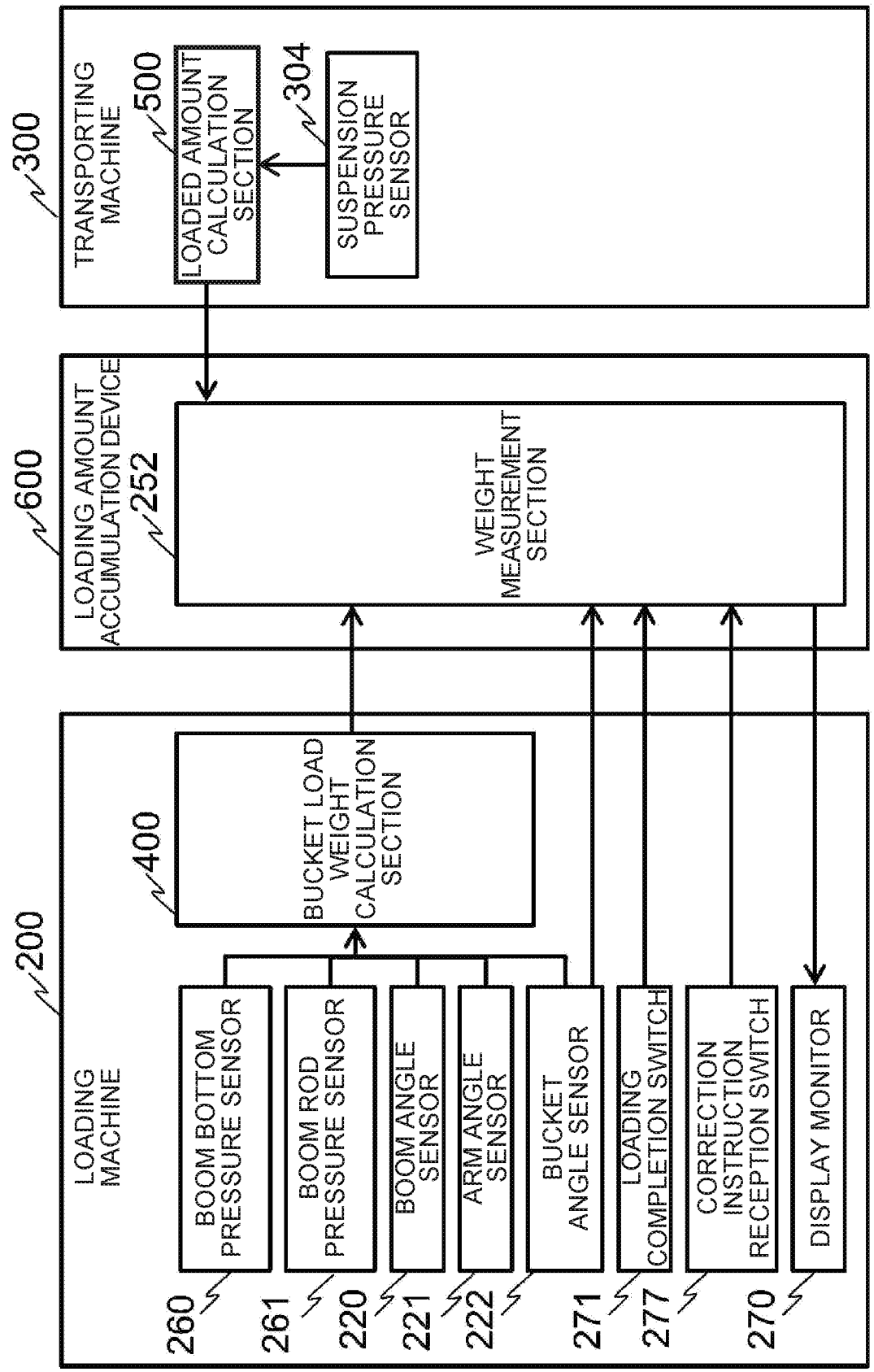
FIG. 21 is a system configuration diagram of a modification of the embodiment of the present invention.

Incidentally, the correction instruction reception switch 277 is set, for example, onto the display screen 270a as a correction instruction reception region 277r. An example of the display screen 270a of the present embodiment is shown in FIG. 21.

Incidentally, in the present embodiment, the display value of the loading amount display area 273 changes in accordance with the flow of FIG. 19. When the correction instruction reception switch 277 is depressed to permit the correction, a loading amount overwritten with the loaded amount of the dump truck 300 is displayed on the loading amount display area 273. Meanwhile, since the overwriting of the loading amount is not performed when the correction instruction reception switch 277 is not depressed, the previously-calculated loading amount (loading amount being not overwritten with the loaded amount of the dump truck 300) is displayed.

As described above, according to the present embodiment, the instruction reception section 408 receiving the instruction of the operator is further provided, and the loading amount correction section 406 performs correction only when the absolute value of the difference is larger than the threshold value, and when receiving an instruction to permit the correction through the instruction reception section 408. That is, according to the present embodiment, only when the operator of the hydraulic excavator 200 has allowed the correction, the correction of the loading amount is performed. It is therefore possible to prevent an unintended automatic correction and expect a robustness improvement in loading amount measurement.

Incidentally, although the present embodiment has been described by taking for example the case in which it is combined with the first embodiment, the present embodiment may be combined with the second embodiment.

Further, although the above respective embodiments have been described by taking for example the case in which the hydraulic excavator 200 shown in FIG. 2 is used as the loading machine, the embodiments are not limited thereto. For example, any configuration capable of loading onto the dump truck 300 being the transporting machine, such as the number of joints of the working front 207, or the like can be applied.

The control device 280 of the hydraulic excavator 200 is not limited to the above configuration either. For example, the controller 251 for display control may realize even the function of the controller 250 for hydraulic control without providing the controller 250 for hydraulic control.

Further, the above respective embodiments have been described by taking for example the case where the dump truck 300 shown in FIG. 4 is used as the transporting machine, but are not limited thereto. Any transporting machine may be adopted if being capable of loading operation by the loading machine. For example, though the number of the wheels is set as four, it is of course possible to apply even a configuration such as the number of wheels being set to six.

The loading amount calculation processing is not limited to the above processing flow either. Any means capable of calculating the loading amount may be used. For example, though the bucket angle sensor signal 222s is used for the bucket dumping operation time determination (accumulation determination) by the bucket load weight calculation section 400 in the above processing flow, the operation signal of the bucket control lever 242 may be used. Further, even in the bucket load weight calculation by the bucket load weight calculation section 400, the boom raise operation time is set as a trigger of the bucket load weight calculation, but the pivoting operation of the upperstructure 202 to the lower vehicle body 201 may be set as a trigger.

Also, in the above respective embodiments, the loaded amount is calculated using the relation between the predetermined suspension pressure and loaded amount such as that shown in FIG. 11, but is not limited thereto. Any means capable of measuring the weight of the object loaded on the vessel 301 may be used.

Further, the layout and display items of the display screen displayed on the display monitor 270 are not limited to the example of the above display screen 270a either. For example, the loaded amount of the dump truck 300, the result of calculation of the difference between the loading amount and the loaded amount, etc. may be displayed together.

Furthermore, the above respective embodiments have been described by taking for example the case where the threshold value Dth used for the accumulation success/failure determination is stored in the ROM 293 or RAM 292 in advance, but are not limited thereto. There may be configured such that, for example, a dedicated setter is newly connected to the controller 251 for display control, and the operator of the loading machine is capable of setting and changing the threshold value Dth through the setter. In this case, the set threshold value Dth is stored in the RAM 292, for example. Thus, since the operator of the loading machine is capable of changing the threshold value as appropriate, usability is improved.

Additionally, the above respective embodiments have been described by taking for example the case where the weight measurement sections 252 and 252a are mounted on the hydraulic excavator 200, but are not limited thereto. The weight measurement sections 252 and 252a may be independently provided as a loading amount accumulation device 600 as shown in FIG. 21, for example. In this case, the loading amount accumulation device 600 may be disposed in a control center or the like, for example. In this case, a loading amount accumulation system 100a is constituted of a hydraulic excavator 200, a dump truck 300, and the loading amount accumulation device 600 as shown in FIG. 21. Incidentally, the functional blocks of the weight measurement sections 252 and 252a are similar to the examples shown in FIG. 5 and FIG. 18.

Incidentally, the loading amount accumulation device 600 includes a CPU, a memory, a storage device, and a communication I/F. Then, in the loading amount accumulation device 600, the weight measurement sections 252 and 252a are realized by allowing the CPU to load a program stored in advance in the storage device into the memory and execute the same. Further, the transmission and reception of data between the hydraulic excavator 200 and the dump truck 300 is performed via the communication I/F.

Further, in the above respective embodiments and the example of FIG. 21, each of the weight measurement sections 252 and 252a includes the display monitor control section 407 and outputs the result of calculation to the display monitor 270 included in the hydraulic excavator 200, but is not limited thereto. Instead of the display monitor control section 407, an output section realized by the output I/F 296 is provided and may be configured so as to output the result of calculation to an external device other than the display monitor 270.

REFERENCE SIGNS LIST

100: loading amount accumulation system, 100a: loading amount accumulation system, 200: hydraulic excavator, 201: lower vehicle body, 202: upperstructure, 203: cab, 204: main pump, 205: hydraulic oil tank, 206: communication device, 206s: communication signal, 207: working front, 210: boom, 211: arm, 212: bucket, 213: boom cylinder, 213a: bottom side oil chamber, 213b: rod side oil chamber, 214: arm cylinder, 214a: bottom side oil chamber, 214b: rod side oil chamber, 215: bucket cylinder, 215a: bottom side oil chamber, 215b: rod side oil chamber, 216: revolving motor, 216a: oil passage, 216b: oil passage, 220: boom angle sensor, 220s: boom angle sensor signal, 221: arm angle sensor, 221s: arm angle sensor signal, 222: bucket angle sensor, 222s: bucket angle sensor signal, 230: control valve, 231: control valve, 232: control valve, 233: control valve, 240: boom control lever, 241: arm control lever, 242: bucket control lever, 243: revolving control lever, 250: controller for hydraulic control, 251: controller for display control, 251a: controller for display control, 252: weight measurement section, 252a: weight measurement section, 260: boom bottom pressure sensor, 260s: boom bottom pressure sensor signal, 261: boom rod pressure sensor, 261s: boom rod pressure sensor signal, 270: display monitor, 270a: display screen, 270s: display monitor signal, 271: loading completion switch, 271r: loading completion instruction reception region, 271s: loading completion signal, 272: bucket load weight display area, 273: loading amount display area, 274: determination result display area, 275: failure content display area, 275a: lamp, 275b: lamp, 277: correction instruction reception switch, 277r: correction instruction reception region, 277s: correction instruction reception signal, 280: control device, 291: CPU, 292: RAM, 293: ROM, 295: communication I/F, 300: dump truck, 301: vessel, 302: wheel, 303: suspension cylinder, 304: suspension pressure sensor, 304s: suspension pressure sensor signal, 306: communication device, 306s: communication signal, 307: vehicle main body, 310: weight measurement controller, 400: bucket load weight calculation section, 401: accumulation determination section, 402: loading amount calculation section, 403: loading amount storage section, 404: difference calculation section, 405: accumulation success/failure determination section, 406: loading amount correction section, 407: display monitor control section, 408: instruction reception section, 409: loading completion determination section, 500: loaded amount calculation section, 600: loading amount accumulation device.

The invention claimed is:

1. A loading amount accumulation device comprising:
a loading amount storage section which stores a loading amount;
a loading amount calculation section which accumulates input load weight data about a transport object in a working front provided to a loading machine to the loading amount stored in the loading amount storage section, and updates the loading amount stored in the loading amount storage section by a value after being accumulated;
a difference calculation section which calculates a difference between input data about a loaded amount of a vessel provided to a transporting machine and the loading amount stored in the loading amount storage section;
an accumulation success/failure determination section which compares an absolute value of the difference calculated by the difference calculation section and a predetermined threshold value, determines that accumulation has failed when the absolute value is larger than the threshold value, and outputs a determination result;
a loading amount correction section which, when the determination result indicative of an accumulation failure is output from the accumulation success/failure determination section, performs correction so as to set a loaded amount data as the loading amount, and updates the loading amount stored in the loading amount storage section by the loading amount after being subjected to the correction; and
an output section which outputs the loading amount stored in the loading amount storage section.

2. The loading amount accumulation device according to claim 1, wherein the output section is connected to a display device and outputs the loading amount stored in the loading amount storage section to the display device.

3. The loading amount accumulation device according to claim 1, wherein when the determination result indicative of the accumulation failure is output from the accumulation success/failure determination section, the output section further outputs information indicating that the absolute value is larger than the threshold value.

4. The loading amount accumulation device according to claim 1,
wherein when it is determined that the accumulation has failed, the accumulation success/failure determination section determines the positive or negative sign of the difference calculated by the difference calculation section, and further outputs the determination result, and
the output section further outputs the determination result output from the accumulation success/failure determination section.

5. The loading amount accumulation device according to claim 1, further comprising an instruction reception section which is connected to a correction instruction reception switch receiving an instruction from an operator and receives an instruction to permit the correction by a loaded amount data through the correction instruction reception switch,
wherein when the absolute value of the difference is larger than the threshold value, and further when the instruction reception section has received the instruction to permit the correction, the loading amount correction section performs the correction.

6. The loading amount accumulation device according to claim 1, wherein the threshold value is set to be less than or equal to a rated capacity of a bucket provided in the working front.

7. A loading amount accumulation system comprising:
a loading machine;
a transporting machine; and
a loading amount accumulation device,
wherein the loading machine includes: an angle sensor which detects a posture of a working front of loading a transport object into the transporting machine with respect to an upperstructure to which the working front is mounted; a bottom pressure sensor which detects bottom pressure of a hydraulic cylinder driving the working front; a rod pressure sensor which detects rod pressure of the hydraulic cylinder; and a load weight calculation section which, based on an angle sensor signal output from the angle sensor, a bottom pressure sensor signal output from the bottom pressure sensor, and a rod pressure sensor signal output from the rod pressure sensor, calculates a load weight of the transport object in the working front and outputs the same as load weight data, the transporting machine includes: a suspension pressure sensor which detects inner pressure of a suspension cylinder; and a loaded amount calculation section which, based on a suspension pressure sensor signal output from the suspension pressure sensor, calculates a loaded amount loaded in a vessel loading the transport object, and outputs the same as loaded amount data, and the loading amount accumulation device includes:

a loading amount storage section which stores a loading amount;

a loading amount calculation section which accumulates the load weight data calculated by the load weight calculation section to the loading amount stored in the loading amount storage section, and updates the loading amount stored in the loading amount storage section by a value after being accumulated;

a difference calculation section which calculates a difference between the loaded amount data calculated by the loaded amount calculation section and the loading amount stored in the loading amount storage section;

an accumulation success/failure determination section which compares an absolute value of the difference calculated by the difference calculation section and a predetermined threshold value, determines that accumulation has failed when the absolute value is larger than the threshold value, and outputs a determination result;

a loading amount correction section which, when the determination result indicative of an accumulation failure is output from the accumulation success/failure determination section, performs correction so as to set the loaded amount data as the loading amount, and updates the loading amount stored in the loading amount storage section by the loading amount after being subjected to the correction; and an output section which outputs the loading amount stored in the loading amount storage section.

\* \* \* \* \*